US009885987B2

(12) United States Patent
Chillscyzn et al.

(10) Patent No.: US 9,885,987 B2
(45) Date of Patent: *Feb. 6, 2018

(54) LAYER TRANSFUSION FOR ADDITIVE MANUFACTURING

(71) Applicant: Stratasys, Inc., Eden Prairie, MN (US)

(72) Inventors: Steven A. Chillscyzn, Victoria, MN (US); James W. Comb, Hamel, MN (US); William J. Hanson, Carlsbad, CA (US); J. Randolph Sanders, Rancho Santa Fe, CA (US); Michael W. Bacus, Temecula, CA (US)

(73) Assignee: Stratasys, Inc., Eden Prairie, MN (US)

( * ) Notice: Subject to any disclaimer, the term of this patent is extended or adjusted under 35 U.S.C. 154(b) by 733 days.

This patent is subject to a terminal disclaimer.

(21) Appl. No.: 13/624,495

(22) Filed: Sep. 21, 2012

(65) Prior Publication Data

US 2013/0075033 A1 Mar. 28, 2013

Related U.S. Application Data

(60) Provisional application No. 61/538,491, filed on Sep. 23, 2011.

(51) Int. Cl.
*B29C 67/00* (2017.01)
*G03G 15/16* (2006.01)
(Continued)

(52) U.S. Cl.
CPC ......... *G03G 15/224* (2013.01); *B29C 64/141* (2017.08); *B29C 64/20* (2017.08);
(Continued)

(58) Field of Classification Search
CPC ............ B29C 67/0051; B29C 67/0074; B29C 67/0077; B29C 67/0085; B29C 64/10;
(Continued)

(56) References Cited

U.S. PATENT DOCUMENTS 2,297,691 A 10/1942 Carlson
3,666,247 A 5/1972 Banks
(Continued)

FOREIGN PATENT DOCUMENTS

CN 101310964 11/2008
EP 0712051 A2 5/1996
(Continued)

OTHER PUBLICATIONS

USPTO Scientific & Technical Information Center Full Translation of Yamada, JP 10-207194 A. Aug. 2016.*
(Continued)

*Primary Examiner* — Michael A Tolin
(74) *Attorney, Agent, or Firm* — Peter J. Ims; Westman, Champlin & Koehler, P.A.

(57) ABSTRACT

An additive manufacturing system comprising a transfer medium configured to receive the layers from a imaging engine, a heater configured to heat the layers on the transfer medium, and a layer transfusion assembly that includes a build platform, and is configured to transfuse the heated layers onto the build platform in a layer-by-layer manner to print a three-dimensional part.

22 Claims, 21 Drawing Sheets

(51) Int. Cl.

| | | |
|---|---|---|
| G03G 15/22 | (2006.01) | |
| B33Y 10/00 | (2015.01) | |
| B33Y 30/00 | (2015.01) | |
| B29C 64/236 | (2017.01) | |
| B29C 64/232 | (2017.01) | |
| G03G 15/20 | (2006.01) | |
| B29C 64/141 | (2017.01) | |
| B29C 64/20 | (2017.01) | |

(52) U.S. Cl.
CPC .......... *B29C 64/232* (2017.08); *B29C 64/236* (2017.08); *B33Y 10/00* (2014.12); *B33Y 30/00* (2014.12); *G03G 15/169* (2013.01); *G03G 15/2021* (2013.01); *G03G 2215/1695* (2013.01); *Y10T 156/17* (2015.01)

(58) Field of Classification Search
CPC ..... B29C 64/141; B29C 64/153; B29C 64/20; B29C 64/205; B29C 64/227; B29C 64/232; B29C 64/236; B29C 64/295; B29C 64/364; G03G 13/20; G03G 15/20; G03G 15/22; G03G 15/221; G03G 15/224; G03G 15/24; G03G 13/08; G03G 13/16; G03G 15/1605; G03G 15/1615; G03G 15/162; G03G 15/1625; G03G 15/167; G03G 15/1685; G03G 15/169; G03G 15/2021; G03G 2015/1676; G03G 2015/1695; B33Y 10/00; B33Y 30/00

See application file for complete search history.

(56) References Cited

U.S. PATENT DOCUMENTS

| | | | |
|---|---|---|---|
| 4,285,754 A | 8/1981 | DiMatteo | |
| 4,988,602 A | 1/1991 | Jongewaard et al. | |
| 5,088,047 A | 2/1992 | Bynum | |
| 5,099,288 A | 3/1992 | Britto et al. | |
| 5,234,784 A * | 8/1993 | Aslam et al. | 430/124.13 |
| 5,254,421 A | 10/1993 | Coppens et al. | |
| 5,354,414 A | 10/1994 | Feygin | |
| 5,514,232 A | 5/1996 | Burns | |
| 5,593,531 A | 1/1997 | Penn | |
| 5,594,652 A | 1/1997 | Penn et al. | |
| 5,866,058 A | 2/1999 | Batchelder et al. | |
| 5,981,616 A | 11/1999 | Yamamura et al. | |
| 5,990,268 A | 11/1999 | Dickens, Jr. et al. | |
| 6,052,551 A | 4/2000 | De Cock et al. | |
| 6,066,285 A | 5/2000 | Kumar | |
| 6,169,605 B1 | 1/2001 | Penn et al. | |
| 6,206,672 B1 | 3/2001 | Grenda | |
| 6,329,115 B1 | 12/2001 | Yamashita | |
| 6,376,148 B1 | 4/2002 | Liu et al. | |
| 6,509,128 B1 | 1/2003 | Everaerts et al. | |
| 6,531,086 B1 | 3/2003 | Larsson | 264/497 |
| 6,780,368 B2 | 8/2004 | Liu et al. | |
| 6,799,959 B1 | 10/2004 | Tochimoto et al. | |
| 6,815,636 B2 | 11/2004 | Chung et al. | 219/121.65 |
| 6,887,640 B2 | 5/2005 | Zhang et al. | |
| 6,909,516 B1 | 6/2005 | Hoover | |
| 7,011,783 B2 | 3/2006 | Fong | |
| 7,077,638 B2 | 7/2006 | Leyden et al. | |
| 7,208,257 B2 | 4/2007 | Cheng et al. | |
| 7,261,541 B2 | 8/2007 | Fong | |
| 7,261,542 B2 | 8/2007 | Hickerson et al. | |
| 7,291,242 B2 | 11/2007 | Khoshnevis | 156/308.2 |
| 7,435,763 B2 | 10/2008 | Farr et al. | |
| 7,706,910 B2 | 4/2010 | Hull et al. | |
| 7,815,826 B2 | 10/2010 | Serdy et al. | |
| 7,988,906 B2 | 8/2011 | Monsheimer et al. | |
| 8,047,251 B2 | 11/2011 | Khoshnevis | 156/497 |
| 8,119,053 B1 | 2/2012 | Bedal et al. | 264/308 |
| 8,124,192 B2 | 2/2012 | Paasche et al. | 427/470 |
| 8,147,910 B2 | 4/2012 | Kritchman | |
| 8,173,258 B2 | 5/2012 | Monsheimer et al. | |
| 8,216,757 B2 | 7/2012 | Mizutani et al. | |
| 8,221,671 B2 | 7/2012 | Hull et al. | 264/405 |
| 8,249,480 B2 | 8/2012 | Aslam et al. | 399/69 |
| 8,718,522 B2 | 5/2014 | Chillscyzn et al. | |
| 2002/0093115 A1 | 7/2002 | Jang et al. | |
| 2002/0145213 A1 | 10/2002 | Liu et al. | |
| 2004/0232583 A1 | 11/2004 | Monsheimer et al. | |
| 2005/0207801 A1 | 9/2005 | Kunii et al. | |
| 2005/0218549 A1 | 10/2005 | Farr et al. | |
| 2008/0032083 A1 | 2/2008 | Serdy et al. | |
| 2008/0169589 A1 | 7/2008 | Sperry et al. | |
| 2008/0171284 A1 | 7/2008 | Hull et al. | |
| 2008/0226346 A1 | 9/2008 | Hull et al. | |
| 2009/0236775 A1 | 9/2009 | Monsheimer et al. | |
| 2009/0304952 A1 * | 12/2009 | Kritchman | B29C 67/0059 427/595 |
| 2011/0117485 A1 | 5/2011 | Hermann et al. | 430/108.6 |
| 2012/0041132 A1 | 2/2012 | Monsheimer et al. | |
| 2012/0139167 A1 | 6/2012 | Fruth et al. | |
| 2012/0201960 A1 | 8/2012 | Hartmann et al. | 427/256 |
| 2012/0202012 A1 | 8/2012 | Grebe et al. | |
| 2012/0237870 A1 | 9/2012 | Watanabe et al. | |
| 2012/0263488 A1 | 10/2012 | Aslam et al. | 399/68 |
| 2012/0274002 A1 | 11/2012 | Uchida | 264/447 |
| 2013/0171434 A1 | 7/2013 | Hirth et al. | |
| 2014/0004462 A1 | 1/2014 | Zaretsky | |
| 2014/0167326 A1 | 6/2014 | Jones et al. | |

FOREIGN PATENT DOCUMENTS

| | | | |
|---|---|---|---|
| GB | 2446386 A | | 8/2008 |
| JP | 5165350 A | | 7/1993 |
| JP | 08-281808 A | * | 10/1996 |
| JP | H08-511217 A | | 11/1996 |
| JP | 10-207194 A | * | 8/1998 |
| JP | 2001075376 A | | 3/2001 |
| JP | 2002-347129 A | * | 12/2002 |
| JP | 2003053849 A | | 2/2003 |
| JP | 2003071940 A | | 3/2003 |
| JP | 2005062860 A | | 3/2005 |
| JP | 2006182813 A | | 7/2006 |
| WO | WO-1998/51464 | | 11/1998 |
| WO | WO 2004/037469 A1 | * | 5/2004 |
| WO | WO-2007/114895 | | 10/2007 |
| WO | 2008096105 | | 8/2008 |
| WO | WO-2011065920 A1 | | 6/2011 |
| WO | 2012/034666 A1 | | 3/2012 |

OTHER PUBLICATIONS

USPTO Scientific & Technical Information Center Full Translation of Nishida, JP 2002-347129 A. Aug. 2016.*
USPTO Scientific & Technical Information Center Full Translation of Koseko, JP 08-281808 A. Aug. 2016.*
Jones, Jason, "Selective Laser Printing", Published Prior to Jan. 14, 2013, 1 page.
International Search Report and Written Opinion dated Jan. 30, 2013 from International Patent Application No. PCT/US2012/056599, filed Sep. 21, 2012.
U.S. Appl. No. 12/675,098, filed Feb. 24, 2010, entitled "Toner Composition, Developer Comprising the Toner Composition, and Method in Connection with the Production of a Volume Body".
"Xerography", Aug. 27, 2010, pp. 1-4, http:/en.wikipedia.org/wiki/Xerography.
Canadian Examiner's Report dated Aug. 10, 2015 for corresponding Canadian Application No. 2,847,351, filed Sep. 21, 2012.
Korean Office Action dated Sep. 10, 2015, for corresponding Korean Application No. 10-2014-7010555, filed Apr. 21, 2014.
English Translation of Yamada et al, JP 10-207194, dated Aug. 7, 1998.
English Translation of Nishida et al. JP 2002-347129, dated Dec. 4, 2002.

* cited by examiner

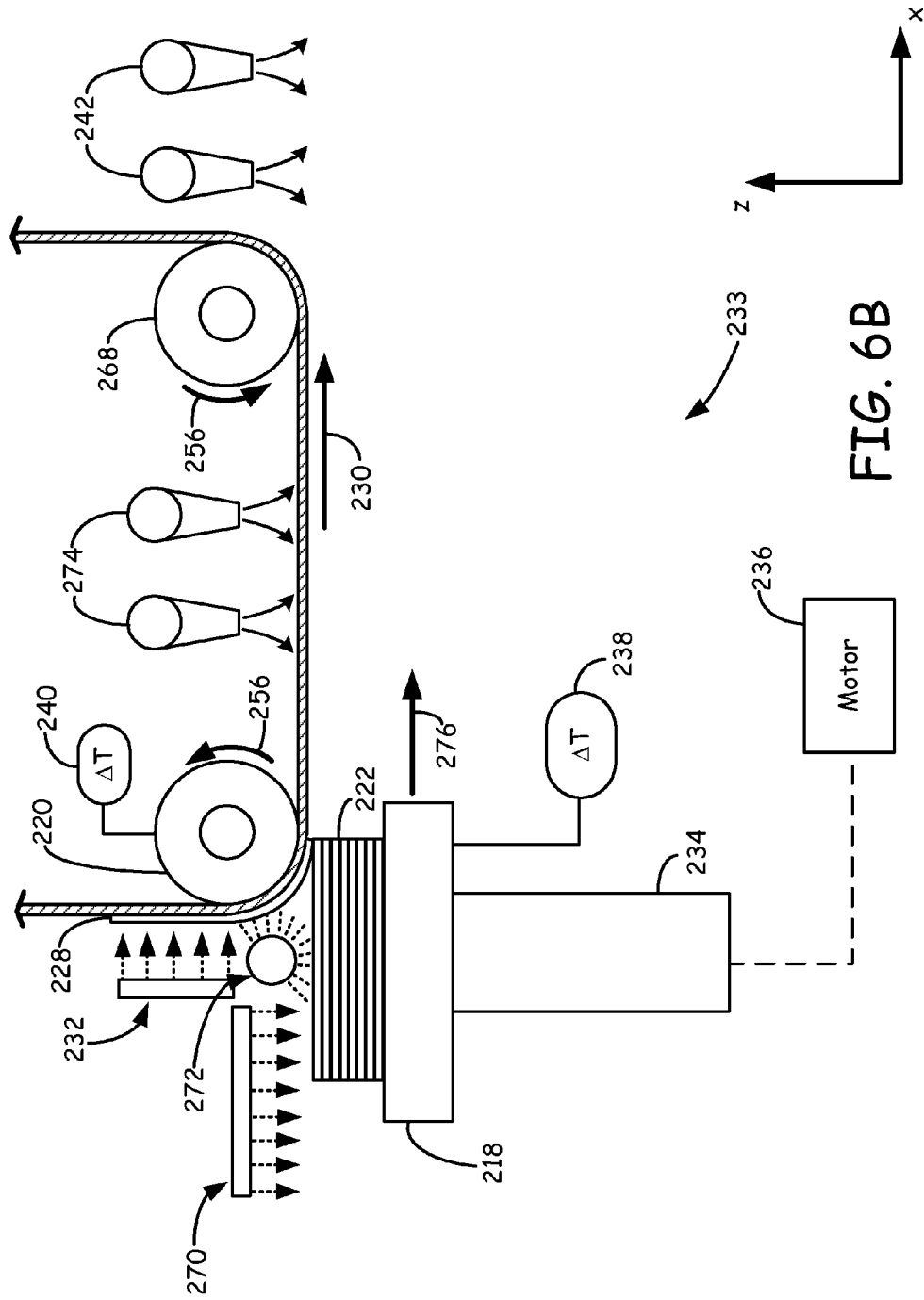

LAYER TRANSFUSION FOR ADDITIVE MANUFACTURING

CROSS-REFERENCE TO RELATED APPLICATION(S)

The present application claims priority to U.S. Provisional Application No. 61/538,491, filed on Sep. 23, 2011, and entitled "LAYER TRANSFUSION FOR ELECTROPHOTOGRAPHY-BASED ADDITIVE MANUFACTURING".

Reference is hereby made to co-filed U.S. patent application Ser. No. 13/624,507, entitled "LAYER TRANSFUSION WITH TRANSFIXING FOR ADDITIVE MANUFACTURING".

Reference is also hereby made to co-filed U.S. patent application Ser. No. 13/624,513, entitled "LAYER TRANSFUSION WITH PART HEATING FOR ADDITIVE MANUFACTURING".

Reference is also hereby made to co-filed U.S. patent application Ser. No. 13/624,519, entitled "LAYER TRANSFUSION WITH ROTATABLE BELT FOR ADDITIVE MANUFACTURING".

BACKGROUND

The present disclosure relates to additive manufacturing systems for building three-dimensional (3D) parts and support structures. In particular, the present disclosure relates to additive manufacturing systems and processes for building 3D parts and support structures using an imaging process, such as electrophotography.

Additive manufacturing systems are used to build 3D parts from digital representations of the 3D parts (e.g., STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the modeling material during fabrication, and is removable from the completed 3D part when the printing process is complete.

In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

An aspect of the present disclosure is directed to an additive manufacturing system for printing a 3D part. The additive manufacturing system includes a transfer medium configured to receive and transfer imaged layers of a thermoplastic-based powder from an imaging engine, and a heater configured to heat the imaged layers on the transfer medium to at least a fusion temperature of the thermoplastic-based powder. The system also includes a layer transfusion assembly comprising a build platform, where the layer transfusion assembly is configured to transfuse the heated layers in a layer-by-layer manner onto the build platform to print the 3D part. The system further includes a cooling unit configured to actively cool the transfused layers to hold the printed 3D part at about an average part temperature that is below a deformation temperature of the 3D part.

Another aspect of the present disclosure is directed to an additive manufacturing system for printing a 3D part, which includes a rotatable belt configured to receive a developed layer of a thermoplastic-based powder from an electrophotography engine, and a heater configured to heat the developed layer on the rotatable belt to a fusion temperature of the thermoplastic-based powder. The system also includes a transfusion element, and a build platform configured to receive the heated layers from the rotatable belt and transfuse the heated layers in a layer-by-layer manner with the transfusion element to print the 3D part on the build platform. The system further includes a cooling unit configured to actively cool the transfused layers to hold the printed 3D part at about an average part temperature that is below a deformation temperature of the 3D part that is below a deformation temperature of the 3D part.

Another aspect of the present disclosure is directed to a method for printing a 3D part with an additive manufacturing system. The method includes imaging a layer of the 3D part from a thermoplastic-based powder, transferring the imaged layer to a transfer medium, and heating the imaged layer while the imaged layer is retained on the transfer medium. The method also includes transfusing the heated layer to a surface of the 3D part, releasing the transfused layer from the transfer medium such that the transfused layer remains adhered to the 3D part, and cooling the transfused layer to hold the printed 3D part at about an average part temperature that is below a deformation temperature of the 3D part.

In some embodiments, the additive manufacturing system is configured to print or otherwise produce the layers at a rate that is faster than a passive thermal diffusion rate of the 3D part.

Definitions

Unless otherwise specified, the following terms as used herein have the meanings provided below:

The terms "transfusion", "transfuse", "transfusing", and the like refer to the adhesion of layers with the use of heat and pressure, where polymer molecules of the layers at least partially interdiffuse.

The term "transfusion pressure" refers to a pressure applied during a transfusion step, such as when transfusing layers of a 3D part together.

The term "deformation temperature" of a 3D part refers to a temperature at which the 3D part softens enough such that a subsequently-applied transfusion pressure, such as during a subsequent transfusion step, overcomes the structural integrity of the 3D part, thereby deforming the 3D part.

Unless otherwise specified, temperatures referred to herein are based on atmospheric pressure (i.e. one atmosphere).

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIGS. 6A-6F are expanded views of another alternative layer transfusion assembly of the electrophotography-based additive manufacturing system, having separate transfusion and release rollers, and which illustrate the layer transfer technique.

DETAILED DESCRIPTION

Figure 1:
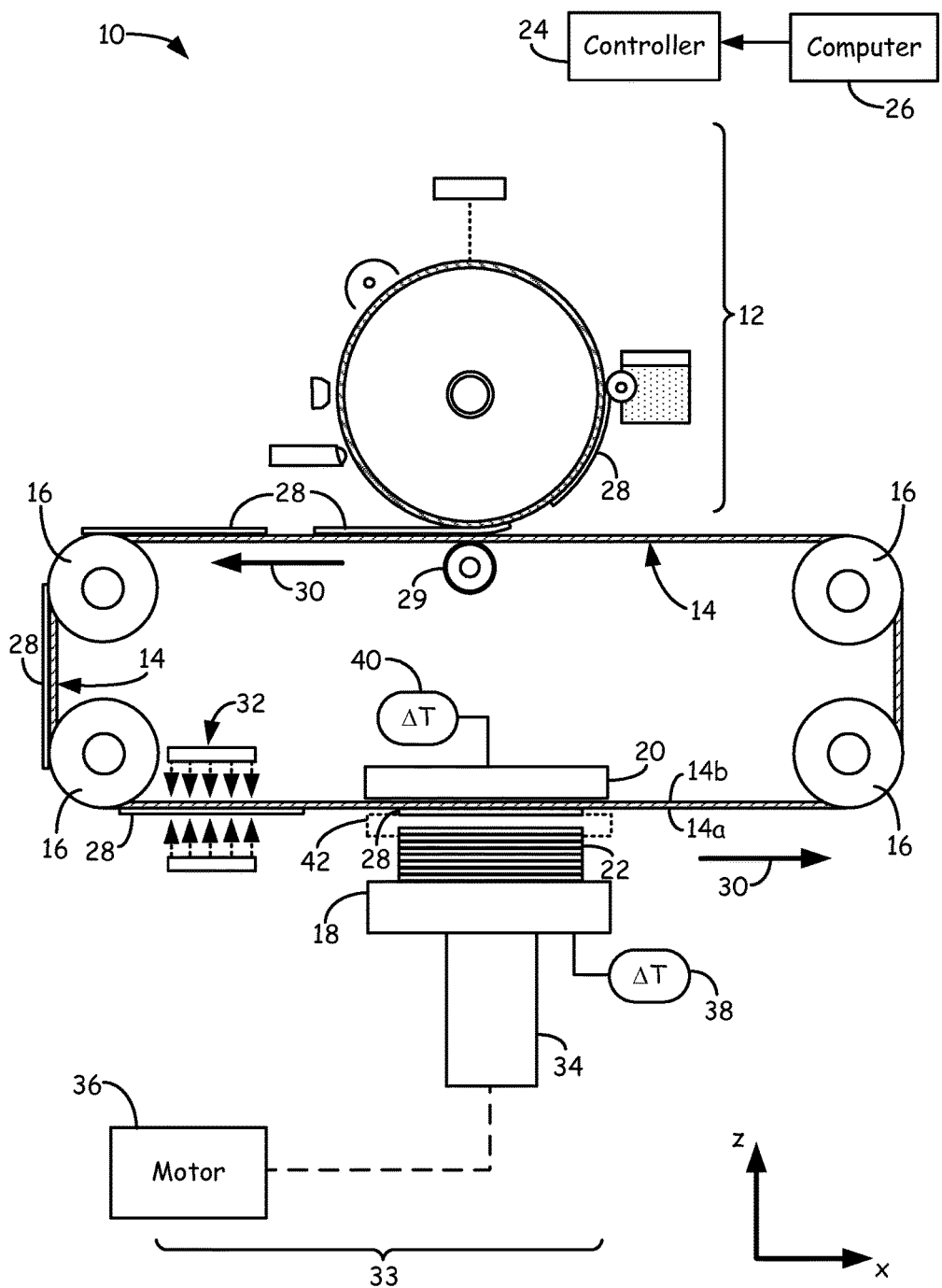
FIG. 1 is a schematic illustration of an electrophotography-based additive manufacturing system of the present disclosure having a layer transfusion assembly with a press plate.

The present disclosure is directed to a layer transfer technique for printing 3D parts and support structures in a layer-by-layer manner, where each layer is printed from a part or support material in a thermally-controlled manner. The layer transfer technique is performed with an imaging system, such as an electrophotography-based additive manufacturing system. For example, each layer may be developed using electrophotography and carried from an electrophotography (EP) engine by a transfer medium (e.g., a rotatable belt or drum). The layer is then transferred to a build platform to print the 3D part (or support structure) in a layer-by-layer manner, where the successive layers are transfused together to produce the 3D part (or support structure).

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, in the present disclosure, a layer retained by the transfer medium is heated to at least a fusion temperature of the layer material. The heated layer is then pressed against a previously-printed layer (or to a build platform) to transfuse the layers together (i.e., a transfusion step). This allows numerous layers of 3D parts and support structures to be built vertically, beyond what is otherwise achievable via electrostatic transfers.

As discussed below, the fusion temperature is a temperature that sufficiently melts the layer material to a fusable state such that polymer molecules of the layer material at least partially interdiffuse during the subsequent transfusion step to promote interlayer or interfacial entanglement. The fusion temperature is high enough to promote the layer transfusion, but it can be too hot for the transfused layer to cleanly release or otherwise delaminate from the transfer medium. This can potentially result in portions of the transfused layer remaining adhered to the transfer medium, or smear upon release from the transfer medium, which negatively impacts feature detail, dimensional accuracy, and porosity of a printed 3D part.

Accordingly, in some embodiments, the layer transfer technique may also include a "transfixing step", in which the transfer medium and/or the transfused layer is cooled prior to releasing the transfused layer from the transfer medium. While not wishing to be bound by theory, it is believed that this transfixing step cools down the interface between the transfer medium and the transfused layer, thus increasing the adhesive force of the interdiffused polymers in adjacent layers relative to the adhesive force of the transfused layer to the surface of the transfer medium, thereby maintaining the transfused layer adhered to the 3D part in a fixed spatial position. This allows the transfused layer to cleanly release from the transfer medium and remain adhered to the 3D part.

Furthermore, because the imaging system is capable of printing the layers at speeds that are much faster than the rate at which heat diffuses through the variable thermal resistance of the 3D parts, heat accumulation in the 3D parts has been observed. As such, as the height of a given 3D part grows, heat dissipation from passive thermal diffusion becomes insufficient to cool the heated layers. The faster the layer speed, the faster the heat accumulation in the bulk of the 3D part. As successive layers are continuously printed, this heat accumulation may exceed a deformation temperature of the 3D part, causing the bulk of the 3D part to soften enough reduces its structural integrity. Such a soft part may deform under a subsequently-applied transfusion pressure during a subsequent transfusion step.

In some embodiments, heat accumulation can be reduced by slowing down the printing process. As can be appreciated, this can substantially increase the time required to print 3D parts, thereby reducing throughput. Instead, to overcome this issue while maintaining fast printing rates, the layer transfer technique may include an "active cooling step" to prevent the 3D part from accumulating additional heat, thereby maintaining the 3D part at a lower "average part temperature" that is lower than the deformation temperature of the 3D part.

In particular, after each layer of the 3D part is transfused, the heat added to the 3D part from the transfused layer is substantially removed prior to the transfusion of the next layer. This holds the 3D part at an average part temperature that is desirably balanced to promote interlayer adhesion and reduce the effects of curling, while also being low enough to prevent the 3D part from softening too much (i.e., below its deformation temperature).

As shown in FIG. 1, system 10 is an example additive manufacturing system for printing 3D parts and support structures using electrophotography, which incorporates the layer transfer technique of the present disclosure. System 10 includes EP engine 12, transfer belt 14, rollers 16, build platform 18, and press plate 20 for printing 3D parts (e.g., 3D part 22) and any associated support structures (not shown). Examples of suitable components and functional operations for system 10 include those disclosed in U.S. patent application Ser. Nos. 13/242,669 and 13/242,841.

In alternative embodiments, system 10 may include different imaging engines for imaging the layers. As discussed below, the layer transfer technique focuses on the transfer of layers from belt 14 (or other transfer medium) to build platform 18, and on belt 14, rather than on the particular imaging engine. However, the layer transfer technique is particularly suitable for use with electrophotography-based additive manufacturing systems (e.g., system 10), where the multiple printed layers in a 3D environment effectively prevents the electrostatic transfer of part and support materials after a given number of layers are printed, as discussed above.

System 10 also includes controller 24, which is one or more control circuits, microprocessor-based engine control systems, and/or digitally-controlled raster imaging processor systems, and which is configured to operate the components of system 10 in a synchronized manner based on printing instructions received from host computer 26. Host computer 26 is one or more computer-based systems configured to communicate with controller 24 to provide the print instructions (and other operating information). For example, host computer 26 may transfer information to controller 24 that relates to the sliced layers of 3D part 22 (and any support structures), thereby allowing system 10 to print 3D part 22 in a layer-by-layer manner.

As discussed in the U.S. patent application Ser. Nos. 13/242,669 and 13/242,841, EP engine 12 is configured to develop successive layers 28 of a thermoplastic-based powder using electrophotography. As used herein, the term "electrophotography" includes ionography. The thermoplastic-based powder includes one or more thermoplastic materials (e.g., an acrylonitrile-butadiene-styrene (ABS) copolymer), and may also include one or more additional components for development with EP engine 12 and triboelectric attraction to belt 14.

The developed layers 28 of the thermoplastic-based powder are then rotated to a first transfer region in which layers 28 are transferred from EP engine 12 to belt 14. Belt 14 is an example transfer medium for transferring or otherwise conveying the developed layers 28 from EP engine 12 to build platform 18 with the assistance of press plate 20. In the shown embodiment, belt 14 includes front or transfer surface 14a and rear or contact surface 14b, where front surface 14a faces EP engine 12. As discussed below, in some embodiments, belt 14 may be a multiple-layer belt with a low-surface-energy film that defines front surface 14a, and which is disposed over a base portion that defines rear surface 14b.

System 10 may also include biasing mechanism 29, which is configured to induce an electrical potential through belt 14 to electrostatically attract layers 28 of the thermoplastic-based powder from EP engine 12 to belt 14. Because layers 28 are each only a single layer increment in thickness at this point in the process, electrostatic attraction is suitable for transferring layers 28 from EP engine 12 to belt 14. However, as mentioned above, the multiple printed layers 28 for 3D part 22 effectively prevents electrostatic transfer of layers 28 from belt 14 to build platform 18 after a given number of layers 28 are printed.

Rollers 16 are a series of drive and/or idler rollers or pulleys that are configured to maintain tension on belt 14 while belt 14 rotates in the rotational direction of arrows 30. This allows belt 14 to maintain a substantially planar orientation when engaging build platform 18 and press plate 20. System 10 may also include service loops (not shown), such as those disclosed in U.S. patent application Ser. No. 13/242,841.

System 10 also includes heater 32, located upstream from build platform 18 and press plate 20, based on the rotational direction of belt 14. Heater 32 is one or more heating devices configured to heat layers 28 to at least a fusion temperature of the thermoplastic-based powder prior to reaching press plate 20. Examples of suitable devices for heater 32 include non-contact radiant heaters (e.g., infrared heaters or microwave heaters), convection heating devices (e.g., heated air blowers), contact heating devices (e.g., heated rollers and/or platens), combinations thereof, and the like, where non-contact radiant heaters are preferred. Each layer 28 desirably passes by (or through) heater 32 for a sufficient residence time to heat the layer 28 to the intended fusion temperature.

As defined above, the fusion temperature is a temperature that sufficiently melts the thermoplastic-based powder to a fusable state. Thus, the fusion temperature will vary depending on the particular layer material used. For example, for an ABS copolymer material, the fusion temperature may range from about 180° C. to about 220° C. depending on the particular copolymer composition. Heating the thermoplastic-based powder does not necessarily require every component of the thermoplastic-based powder to melt. Rather, the overall thermoplastic-based powder needs to reach a fusable state for subsequent transfusion. This typically refers to the one or more thermoplastic materials of the thermoplastic-based powder being sufficiently melted to the fusable state.

Build platform 18, press plate 20, and heater 32 may collectively be referred to as layer transfusion assembly 33. Layer transfusion assembly 33 is configured to transfuse the heated layers 28 from the belt 14 to the previously-transfused layers of 3D part 22 (or onto build platform 18) in a layer-by-layer manner.

Build platform 18 is a platform assembly or platen of system 10 that is configured to receive the heated layers 28 for printing 3D part 22 in a layer-by-layer manner. Build platform 18 is supported by z-axis gantry 34, which is a linear guide mechanism configured to incrementally lower build platform 18 along the vertical z-axis relative to belt 14 and press plate 20 after each pressing step. The movement of build platform 18 with z-axis gantry 34 is operated by z-axis motor 36 based on commands from controller 24, where z-axis motor 36 may be an electrical motor, a hydraulic system, a pneumatic system, or the like.

In the shown embodiment, build platform 18 is heatable with heating element 38 (e.g., an electric heater). Heating element 38 is configured to heat and maintain build platform 18 at an elevated temperature that is greater than room temperature (25° C.), such as at the desired average part temperature of 3D part 22. This allows build platform 18 to assist in maintaining 3D part 22 at this average part temperature.

As mentioned above, the average part temperature for 3D part 22 is desirably high enough to promote interlayer adhesion and to reduce the effects of curling, while also being low enough to prevent 3D part 22 from softening too much (i.e., below its deformation temperature). Suitable average part temperatures for 3D part 22 range from greater than the average solidification temperature of the thermoplastic material(s) of the thermoplastic-based powder to about the glass transition temperature of the thermoplastic material(s). More desirably, the average part temperature is maintained at about the creep relaxation temperature of the thermoplastic material(s) of the thermoplastic-based powder, or within about 10° C. above or below thereof. Examples of suitable techniques for determining the creep relaxation temperatures of materials are disclosed in Batchelder et al., U.S. Pat. No. 5,866,058.

For example, when printing layers 28 of an ABS copolymer-based powder, the average part temperature for 3D part 22 may be about 100° C. This average part temperature allows 3D part 22 to maintain its structural integrity when pressed between build platform 18 and press plate 20 during subsequent transfusion steps. Furthermore, when the topmost layer of 3D part 22 maintained at this temperature and receives a heated layer 28 at a fusion temperature of about 200° C., the transfusion interface temperature for transfusing the layers together starts at about 150° C. This temperature is suitable for the polymer molecules of the layers 28 to at least partially interdiffuse to promote interfacial entanglement.

Press plate 20 is an example heateable element or heatable layer transfusion element, which is configured to press belt 14 and a given heated layer 28 downward against 3D part 22 and build platform 18 during each transfusion step. Press plate 20 may be actuated with a servo mechanism (not shown) configured to move press plate 20 along the vertical z-axis during each transfusion step.

The particular pressure applied during each transfusion step is desirably high enough to adhere the heated layer 28 to the previously-transfused layer 28 (or to build platform 18), allowing the polymer molecules to at least partially interdiffuse. However, the transfusion pressure is also desirably balanced to prevent press plate 20 from compressing 3D part 22 too much, thereby allowing 3D part 22 to maintain its dimensional integrity.

In the shown embodiment, press plate 20 is heatable with heating element 40 (e.g., an electric heater). Heating element 40 is configured to heat and maintain press plate 20 at an elevated temperature that is greater than room temperature (i.e., 25° C.). However, in comparison to the elevated temperature of build platform 18, heating element 40 may heat and maintain press plate 20 at a temperature that is less than the desired average part temperature of 3D part 22. For example, in situations where the intended average part temperature for 3D part 22 is 100° C., heating element 40 may heat and maintain press plate 20 at about 70° C.

The lower temperature for press plate 20 will cool belt 14 from the side of rear surface 14b (i.e., a transfixing step). As discussed above, if the transfused layer 28 remains too hot, it may remain adhered to front surface 14a of belt 14, rather than cleaning releasing from belt 14. As such, cooling belt 14 with the contact from press plate 20 allows the interface between front surface 14a of belt 14 and the transfused layer 28 to cool down enough to cleanly release the transfused layer 28 from belt 14.

On the other hand, due to the large contact surface area between belt 14 and press plate 20, if press plate 20 is maintained at a temperature that is too low (e.g., 25° C.), the contact duration between press plate 20 and belt 14 during the transfusion step may cool the transfused layer 28 down too much, thereby lowering the transfusion interface temperature, which can reduce the interlayer adhesion. As such, in some embodiments, heating element 40 desirably maintains press plate 20 at a temperature that balances these competing thermal effects to facilitate both transfusion and transfixing in a single, combined step.

Figure 2:
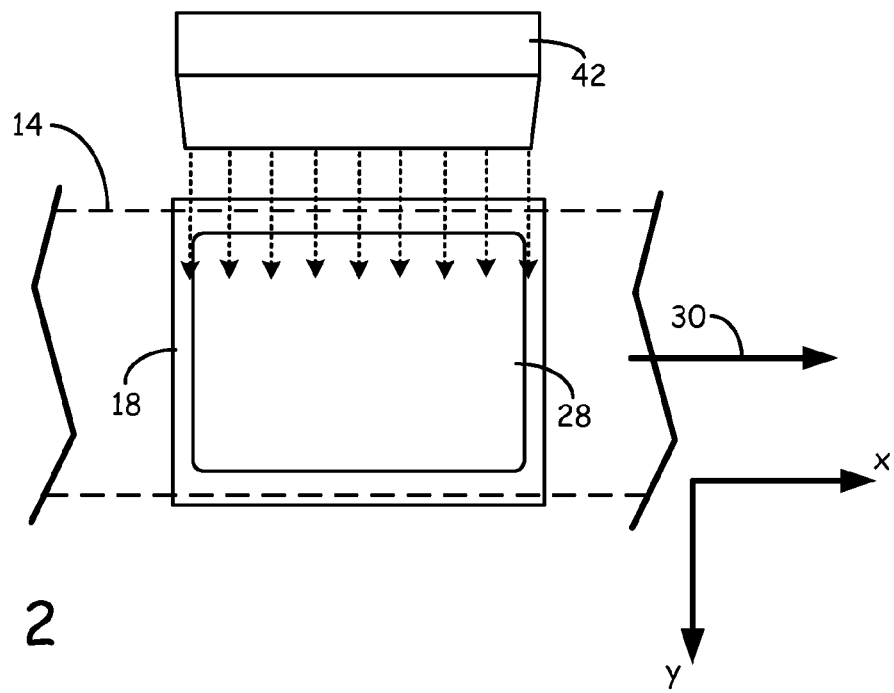
FIG. 2 is a top view of a build platform receiving a heated layer, illustrating an air knife arrangement.

System 10 may also include one or more air knives 42 or other cooling units, where air knife 42 is an example cooling unit configured to blow localized cooling air to the top layers of 3D part 22. As best shown in FIG. 2, air knife 42 is located adjacent to the lateral side of build platform 18 to direct the cooling air laterally relative to the direction of movement of belt 14. This allows air knife 42 to extend along the entire length of 3D part 22, providing good air flow over the top layers of 3D part 22, including the fused layer 28. In an alternative embodiment, system 10 may also include a second air knife 42 (not shown) located at the opposing lateral side of build platform 18. In embodiments having air knives 42 or other cooling units, press plate 20 may be heated to the fusion temperature to promote interdiffusion in the transfusion step. Then, upon release of press plate 20, a separate transfix step may be performed by cooling the transfused layer before release of the layer from the belt 14.

As mentioned above, when system 10 prints layers 28 at high speeds, the printed layers 28 do not have sufficient time to cool down to the desired average part temperature before successive layers 28 are printed. As such, as the height of 3D part 22 grows, heat dissipation from passive thermal diffusion becomes insufficient to cool the heated layers.

Figure 3:
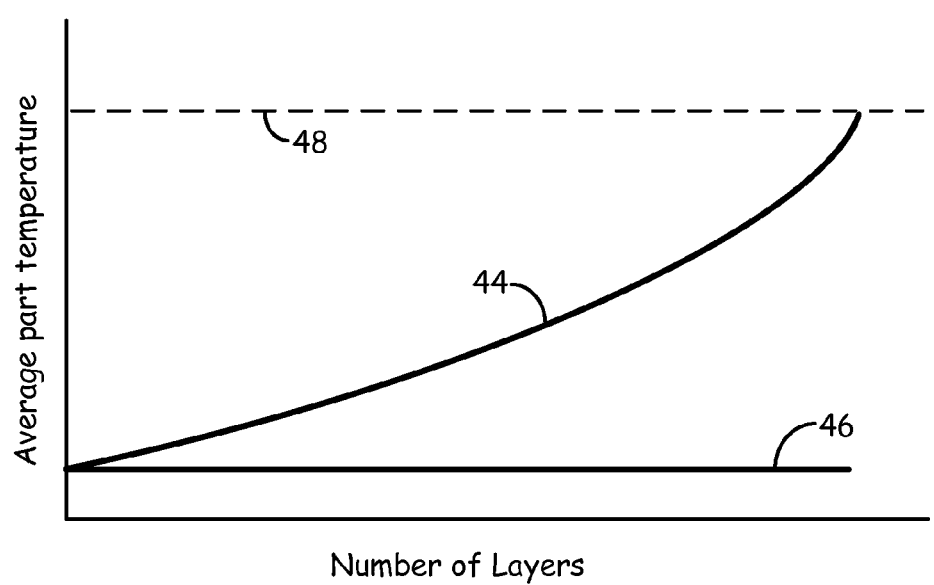
FIG. 3 is a graphical illustration of number of printed layers for a 3D part versus an average part temperature, showing plot lines for a 3D part printed without active cooling and for a 3D part printed with active cooling.

This is depicted in FIG. 3, which is a graphical illustration of the number of layers printed versus the average part temperature for a 3D part printed without the active cooling (represented by line 44) and for 3D part 22 printed with the active cooling (represented by line 46). As shown by line 44, without the active cooling, the heat added by each layer at its fusion temperature will accumulate in the 3D part, causing the average part temperature to increase until the deformation temperature of the 3D part is reached, as illustrated by threshold line 48. At threshold line 48, the temperature in the bulk of the 3D part is high enough such that the part material substantially softens. When the 3D part reaches this point, the transfusion pressure applied by press plate 20 during subsequent transfusion steps may overcome the structural integrity of the 3D part, thereby deforming the 3D part.

Air knife 42, however, actively cools each layer after the transfusion step to prevent the additional heat from accumulating. As shown by line 46, the active cooling substantially removes the heat provided by each layer 28, thereby providing substantially zero heat accumulation after each printed layer 28. As such, 3D part 22 may be substantially maintained at an average part temperature that is below its deformation temperature during the entire printing operation.

In some embodiments, it can be beneficial for the average part temperature to be high enough such that the bulk of 3D part 22 exhibits a small amount of softening. It has been found that when the bulk of 3D part 22 exhibits a small amount of softening that still maintains its overall structural integrity, subsequent transfusion steps with press plate 20 may mildly compress the bulk of 3D part 22, thereby increasing the part density. The increased part density correspondingly reduces brittleness and porosity of the resulting 3D part 22, and increases its z-axis strength. These properties are beneficial for a variety of applications.

While illustrated with air knife 42, system 10 may alternatively include a variety of different cooling units configured to actively cool each layer after the transfusion step to prevent the additional heat from accumulating, such as refrigeration units, liquid-cooling units, and the like. Furthermore, one or more air knives 42 (or other cooling units) may be located at other locations around build platform 18 and press plate 20 to direct the cooling air towards the top layers of 3D part 22. Optionally, system 10 may also include additional heaters (e.g., heaters 270 and 272, shown in FIGS. 6A-6F) to heat the top layer(s) or surface of 3D part 22 to the fusion temperature prior to each subsequent transfusion step.

FIG. 4A-4D illustrate an example process for printing a layer 28 with system 10 using the layer transfer technique of the present disclosure. At the start of the printing operation, build platform 18 and press plate 20 may be heated to their desired temperatures. For example, build platform 18 may be heated to the desired average part temperature for 3D part 22, and press plate 20 may be heated to a temperature that is lower than the desired average part temperature for 3D part 22.

Figure 4A:
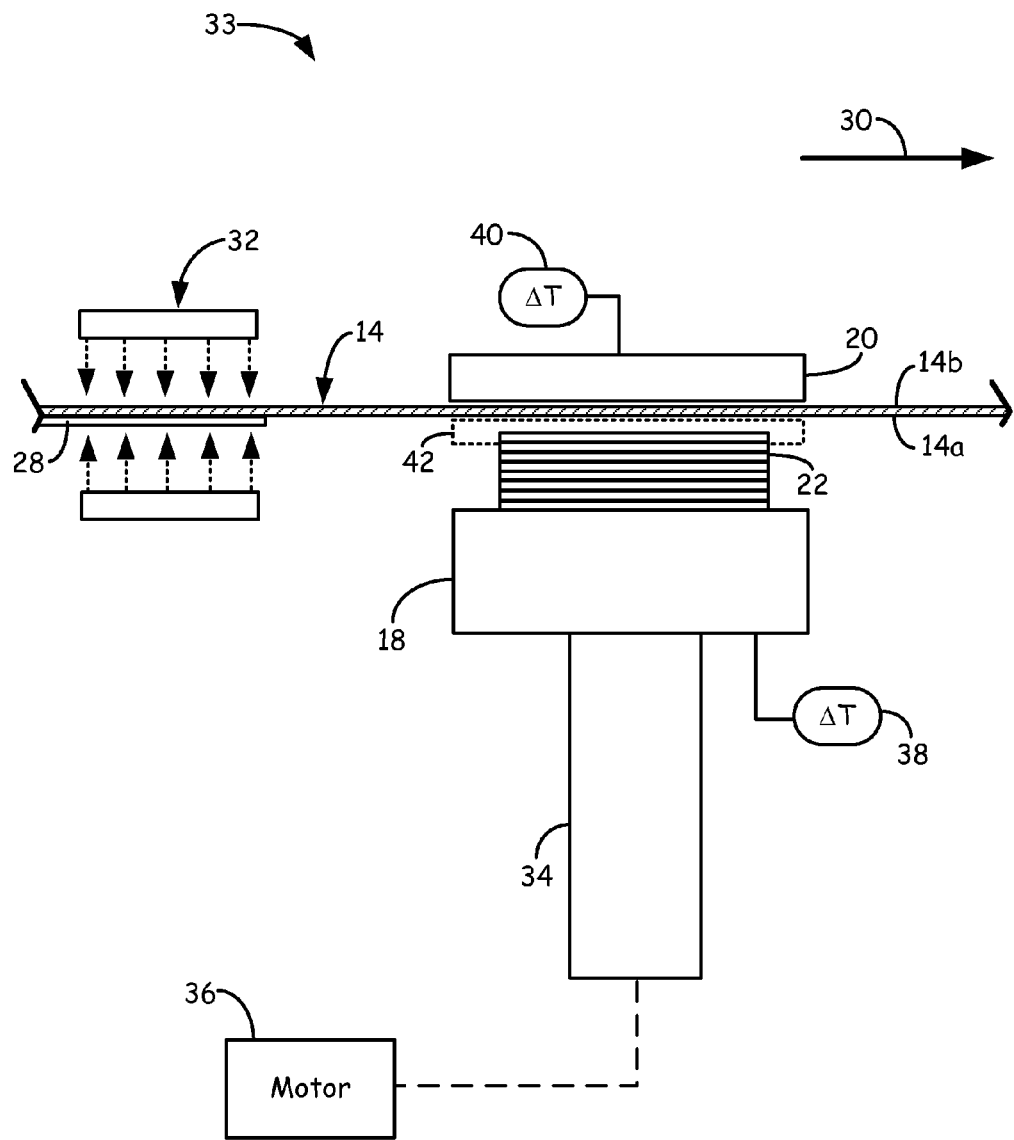
FIGS. 4A-4D are expanded views of the layer transfusion assembly, illustrating a layer transfer technique of the present disclosure.

The printing operation initially involves developing a layer 28 with EP engine 12 (shown in FIG. 1) and transferring the developed layer to heater 32 via belt 14. As shown in FIG. 4A, as the developed layer 28 passes by (or through) heater 32, heater 32 heats the layer 28 and the associated region of belt 14 to at least the fusion temperature of the thermoplastic-based powder.

Figure 4B:
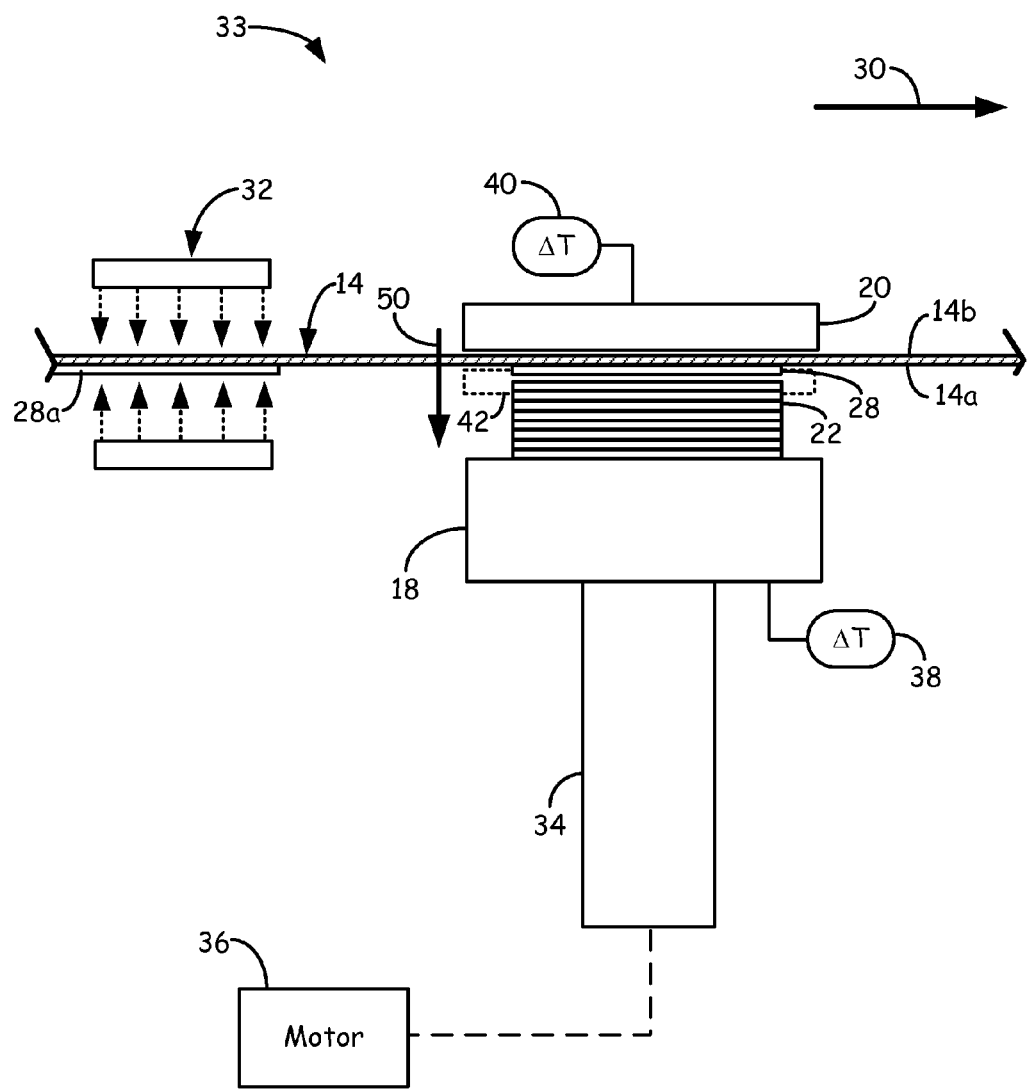
Figure 4C:
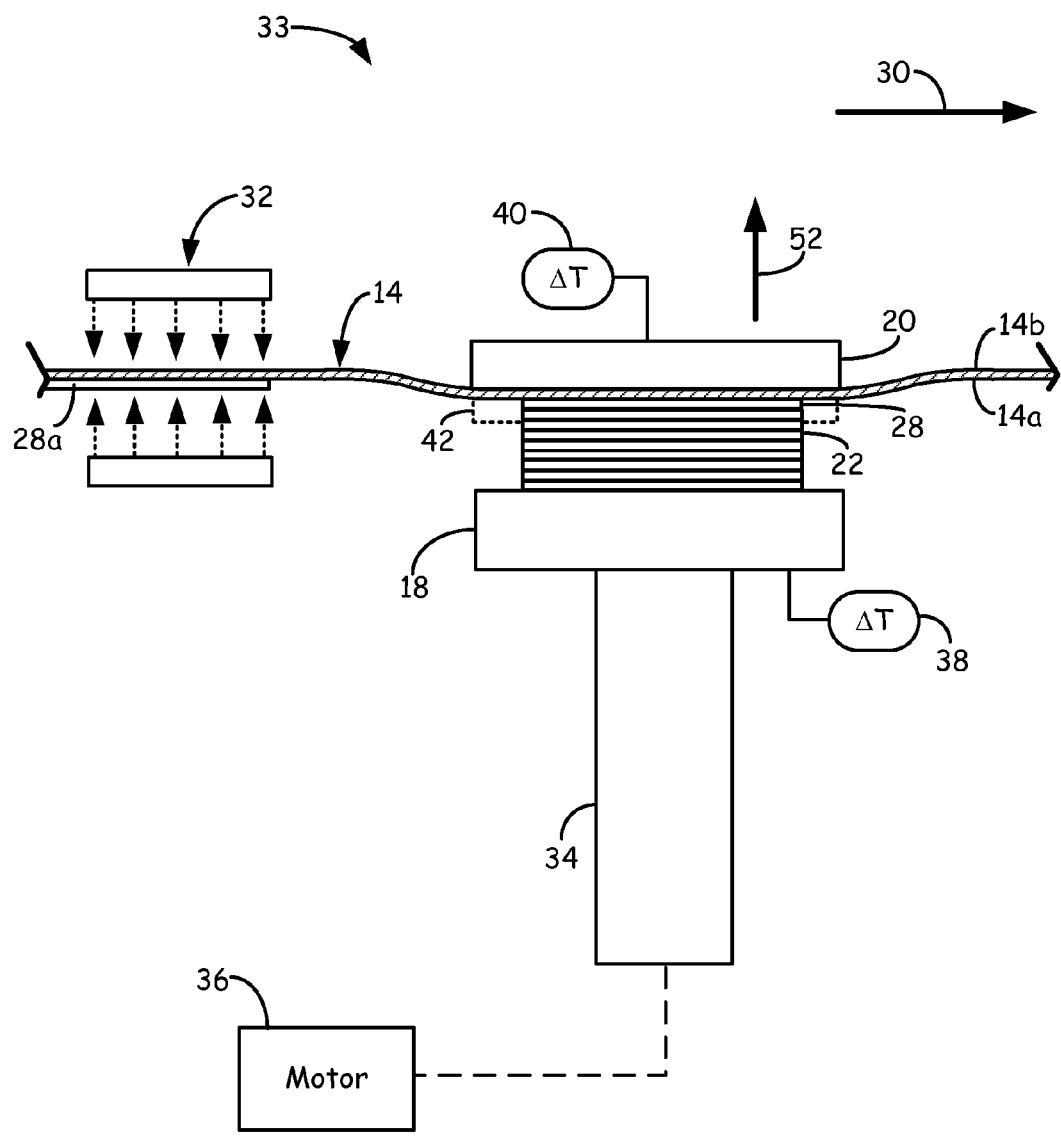
Figure 4D:
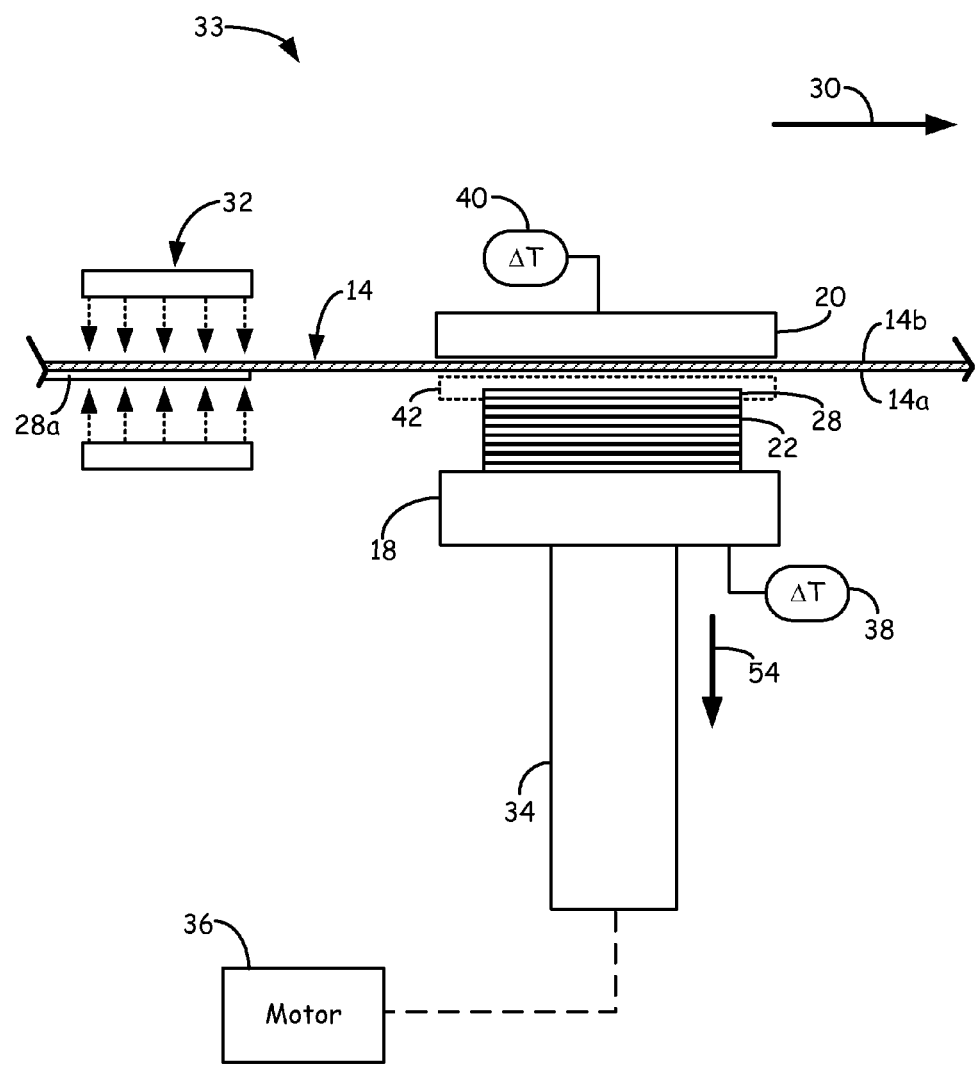

As shown in FIG. 4B, the continued rotation of belt 14 in the direction of arrow 30 aligns the heated layer 28 above build platform 18 with proper registration location along the x-axis. Press plate 20 may then actuate downward, as illustrated by arrow 50, to press the heated layer 28 onto the previously-printed layer of 3D part 22. As shown in FIG. 4C, because layer 28 is heated to at least the fusion temperature of the part material, the pressed layer 28 transfuses to the top surface of 3D part 22.

Examples of suitable durations for pressing during the transfusion step range from about 0.1 seconds to about 1.0 second, with particularly suitable durations ranging from about 0.1 seconds to about 0.5 seconds. In some embodiments, the pressing duration is a fixed value for each layer 28. In alternative embodiments, the pressing duration may be varied based on the dimensions and geometry of 3D part 22. For example, the pressing duration may be reduced for layers 28 having smaller cross-sectional areas and/or fine-feature details, as discussed below.

The temperature of press plate 20, being lower than the desired average part temperature, and substantially lower than the fusion temperature, begins to draw heat from the heated region of belt 14. This assists in releasing the transfused layer 28 by cooling belt 14 from rear side 14b, as discussed above.

After the transfusion/transfixing step is completed, press plate 20 may then be retracted upward, as illustrated by arrow 52, to release the pressure applied to belt 14 and the transfused layer 28. In the embodiment shown in FIG. 4D, this releases the transfused layer 28 from belt 14, allowing the transfused layer 28 to remain transfused to 3D part 22. Additionally, z-axis gantry 34 may lower build platform 18 downward, such as by a single layer increment, as illustrated by arrow 54.

In an alternate embodiment, press plate 20 may be heated to the fusion temperature to assist in the transfusion of layer 28. In this embodiment, layer transfusion assembly 33 is desirably configured such that retracting press plate 20 upward does not immediately release the transfused layer 28 from belt 14. Rather, belt 14 may be maintained in a relatively constant position upon the retraction of press plate 20 by positioning build platform 18 in a higher position relative to that shown in FIG. 4D during the transfusion step. A separate transfixing step may then be utilized.

In this transfixing step, air knife 42 may be activated to cool the transfused layer 28 before releasing it from belt 14. After a duration sufficient to cool the layer material down below the fusion temperature, which maintains the transfused layer 28 in a fixed spatial position and adhered to 3D part 22, build platform 18 is then lowered to release transfused layer 28 from belt 14.

Air knife 42 may also be activated to blow cooling air onto the transfused layer 28 after delamination from belt 14. This actively cools the transfused layer 28 down to the desired average part temperature. Examples of suitable durations for this active cooling step range from about 1.0 second to about 2.0 seconds, which may correspond with the transfer and alignment of the next layer 28.

As can be appreciated, the transfer of layer 28 from belt 14 to build platform 18 requires a pause during the pressing step. Otherwise, the movement of belt 14 in the rotational direction of arrows 30 during the transfusion step may cause a mis-registration of the pressed layer 28, potentially resulting in lower part quality. These pauses during each transfusion step may be accommodated with the use of service loops, such as those disclosed in U.S. patent application Ser. No. 13/242,841. As further shown in FIGS. 4B-4D, as a present layer 28 is being transfused, the next layer 28a may be positioned at heater 32. This allows heater 32 to sufficiently heat the next layer 28a during the required pause while the present layer 28 is transfused to 3D part 22. After the layer 28 is transfused and cooled, the same process may then be repeated for layer 28a, and each subsequent layer for 3D part 22.

Figure 5A:
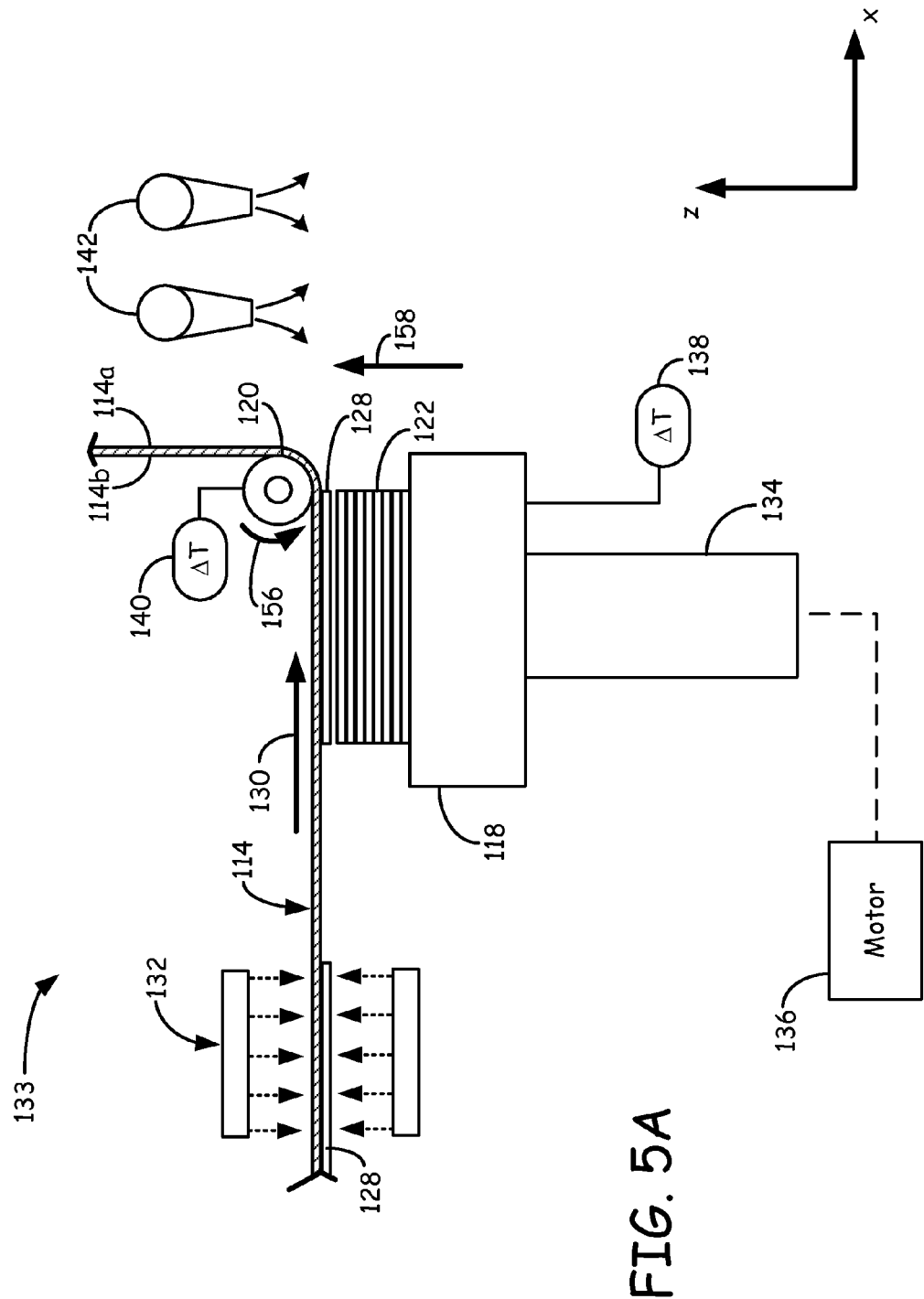
FIGS. 5A-5E are expanded views of an alternative layer transfusion assembly of the electrophotography-based additive manufacturing system, having a nip roller, and which illustrate the layer transfer technique.

FIGS. 5A-5E illustrate layer transfusion assembly 133, which is an alternative to layer transfusion assembly 33 of system 10 (shown in FIGS. 1, 2, and 4A-4D), and where the reference numbers of the respective components are increased by "100" from system 10. As shown in FIG. 5A, layer transfusion assembly 133 includes nip roller 120 in lieu of press plate 20, where nip roller 120 is another example heateable element or heatable layer transfusion element, and is configured to rotate around a fixed axis with the movement of belt 114. In particular, nip roller 120 may roll against rear surface 114b in the direction of arrow 156 while belt 114 rotates in the direction of arrows 130. In some embodiments, nip roller 120 may function as a drive roller for belt 114.

As further shown, air jets 142 (or other suitable cooling units) are used in lieu of air knife 42, and are located downstream from the interface between belt 114 and nip roller 120. Air jets are configured to blow cooling air towards the top layers of 3D part 122 to actively cool the layers after each transfusion step, as discussed below.

In this embodiment, build platform 118 is supported by gantry 134, which is a guide mechanism configured to move build platform 118 along the z-axis and the x-axis to produce a reciprocating rectangular pattern, where the primary motion is back-and-forth along the x-axis. Gantry 134 may be operated by motor 136 based on commands from controller 124, where motor 136 may be an electrical motor, a hydraulic system, a pneumatic system, or the like. Accordingly, the pressure that is applied during each transfusion step is performed by build platform 118.

Prior to printing 3D part 122, build platform 118 and nip roller 120 may be heated to their desired temperatures, as discussed above for build platform 18 and press plate 20. In comparison to press plate 20, heating element 140 may heat nip roller 120 to a higher temperature (e.g., to the average part temperature) since there is a relatively short time for the heat to locally flow from nip roller 120 through belt 114.

During the printing operation, heater 132 heats a developed layer 128 and the associated region of belt 114 to at least the fusion temperature of the thermoplastic-based powder. Belt 114 may then move the heated layer 132 to a predetermined registration location along the x-axis, as shown. Gantry 134 may then actuate build platform 118 upward to engage belt 114, which presses the top layer of 3D part 122 against the heated layer 124, as illustrated by arrow 158. Alternatively, nip roller 120 may be actuated downward to meet the top layer or surface of 3D part 122.

Figure 5B:
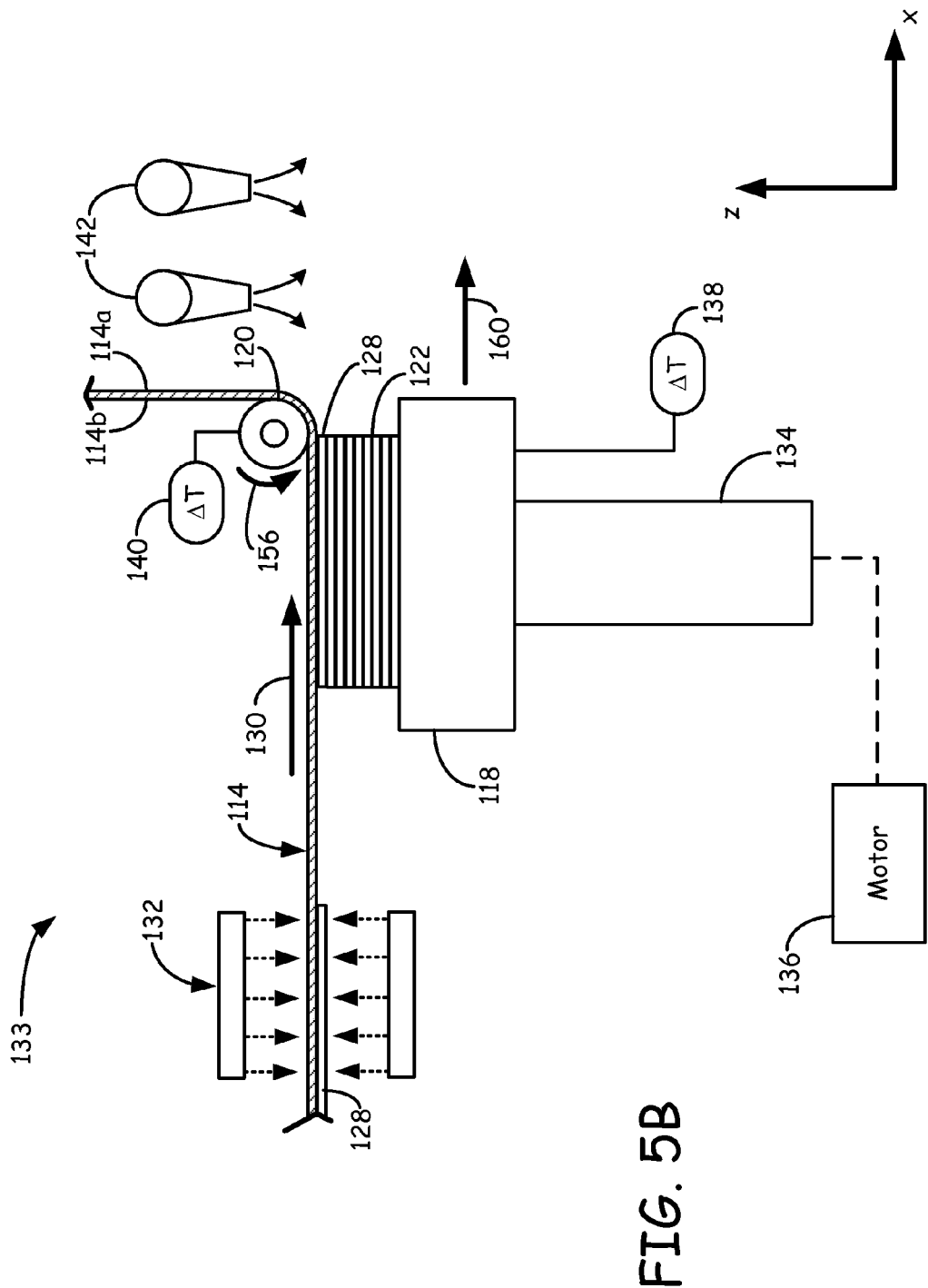

As shown in FIG. 5B, this presses the heated layer 128 between the top layer of 3D part 122 and belt 114 at the location of nip roller 120. While build platform 118 remains engaged with belt 114, gantry 134 may then move build platform 118 (and 3D part 122) along the x-axis in the direction of arrow 160, at a rate that is synchronized with the rotational rate of belt 114 in the direction of arrow 130 (i.e., the same directions and speed). This presses belt 114 and the heated layer 128 between the top layer of 3D part 122 and nip roller 120.

Figure 5C:
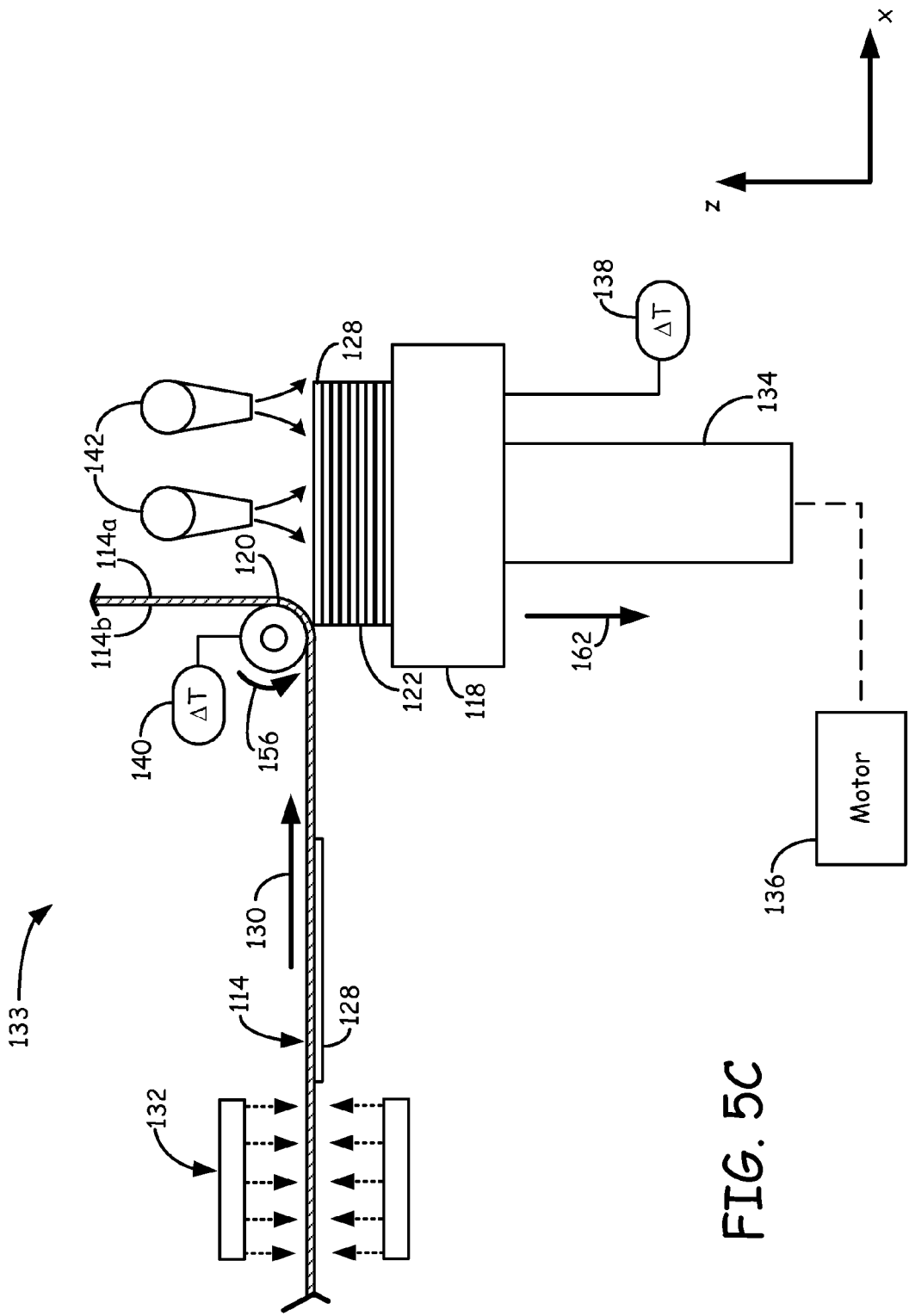

As shown in FIG. 5C, this causes rear surface 114b of belt 114 to roll across nip roller 120 to nip belt 114 and the heated layer 128 against the top layer of 3D part 122. Because layer 128 is heated to the fusion temperature of the part material and 3D part 122 is maintained at the average part temperature, the pressed layer 128 transfuses to the top layer of 3D part 122 in a similar manner to that discussed above for 3D part 22 and layer 28.

As further shown, as the transfused layer 128 passes the nip of nip roller 120, belt 114 wraps around nip roller 120 to separate and disengage from build platform 118. This assists in releasing the transfused layer 128 from belt 114, allowing the transfused layer 128 to remain adhered to 3D part 122. Additionally, air jets 142 blow cooling air towards the top layers of 3D part 122 as build platform 118 moves along the x-axis past nip roller 120 to transfix the transfused layer 128. The transfused layer 128 may be cooled down to the average part temperature by continuing to blow cooling air against the 3D part 122 in between transfusion steps, thus overlapping the transfixing and active cooling steps.

Figure 5D:
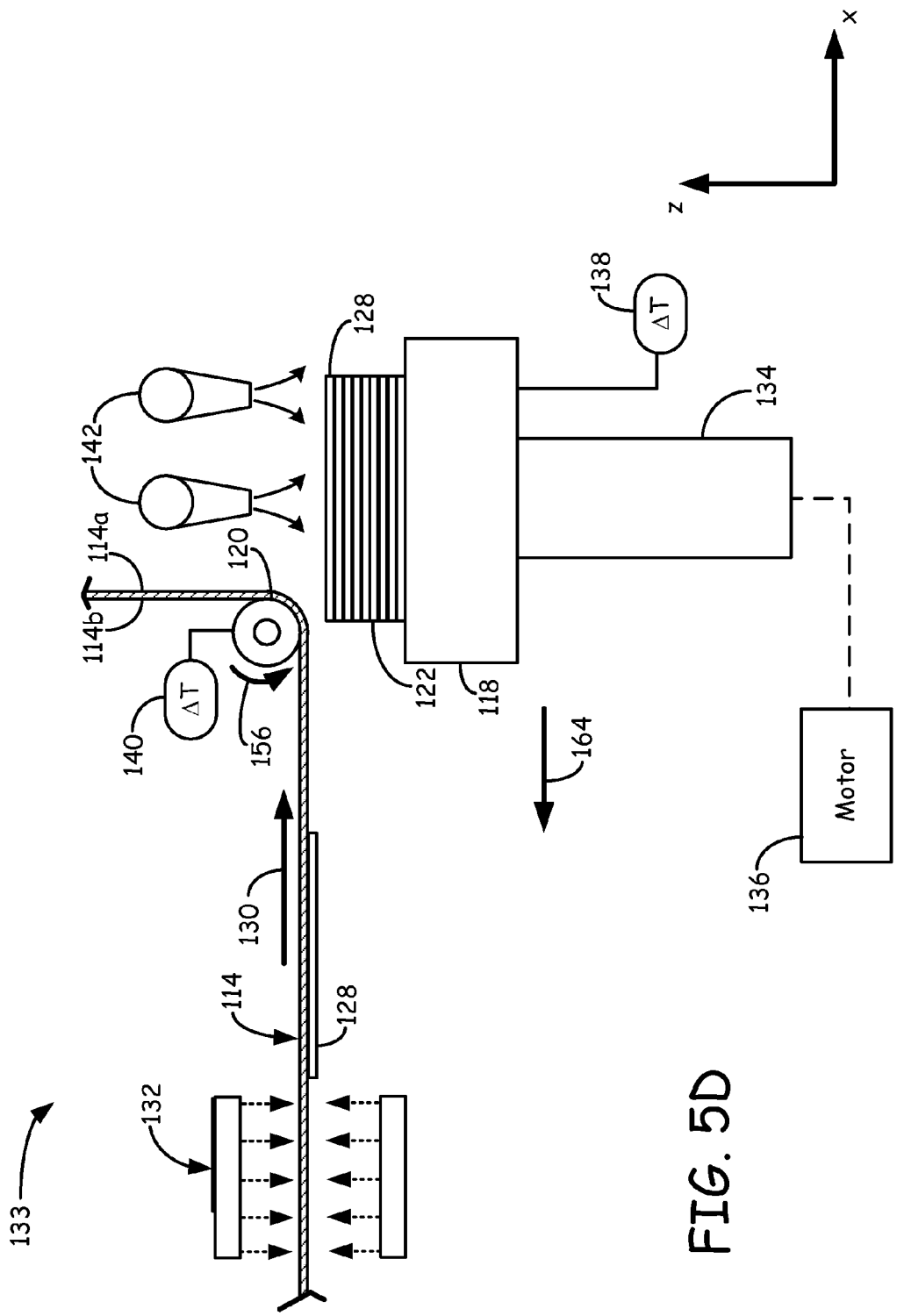
Figure 5E:
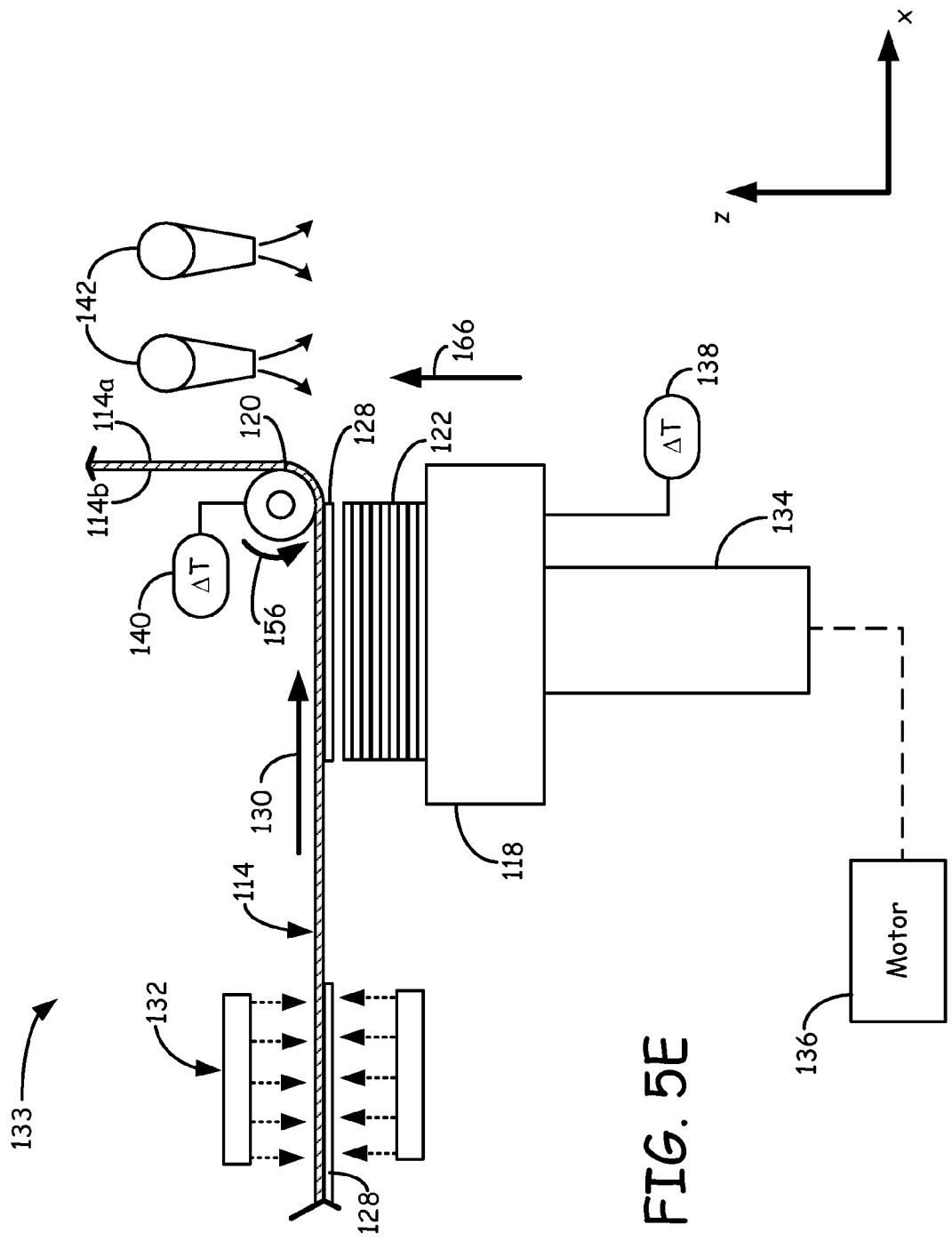

When build platform 118 moves 3D part 122 past nip roller 120, gantry 134 may actuate build platform 118 (and 3D part 122) downward, as illustrated by arrow 162. As shown in FIG. 5D, gantry 134 may then move build platform 118 (and 3D part 122) along the x-axis in the direction of arrow 164, back to a starting position along the x-axis. As shown in FIG. 5E, build platform 118 desirably reaches the starting position as the next heated layer 128 is positioned above 3D part 122. The same process may then be repeated, where gantry 134 actuates build platform 118 upward to press belt 114 and the next heated layer 128 between the top layer of 3D part 122 and roller 120, as illustrated by arrow 166. In this step, however, the height of the top surface of 3D part 122 is offset downward, such as by a single layer increment, compared to the previous pressing step.

As can be appreciated, moving build platform 118 (and 3D part 122) in the reciprocating rectangular pattern allows the transfusion steps to be performed while belt 114 continuously rotates. In particular, moving build platform 118 at a rate that is synchronized with the rotational rate of belt 114, along with the use of nip roller 120, which rotates against rear surface 114b of belt 114, allows the transfusion and transfixing steps to be performed rapidly (e.g., within about 0.1 to about 0.5 seconds). This allows the active cooling steps to range from about 1.0 second to about 2.0 seconds, which may correspond with the transfer and alignment of the next heated layer 28. While the reciprocating rectangular pattern is described as a rectangular pattern with sharp axial corners (defined by arrows 160, 162, 164, and 166), gantry 134 may move build platform 118 (and 3D part 122) in a reciprocating rectangular pattern having rounded or oval-defining corners, so long as build platform 118 moves linearly along the x-axis during the transfusion steps.

FIGS. 6A-6F illustrate layer transfusion assembly 233, which is an alternative to layer transfusion assembly 133 (shown in FIGS. 5A-5E), and where the reference numbers of the respective components are increased by "200" from system 10 (shown in FIGS. 1, 2, and 4A-4D). Layer transfusion assembly 233 may function in a similar manner to layer transfusion assembly 133, where build platform 218 may move in a reciprocating rectangular pattern.

Figure 6A:
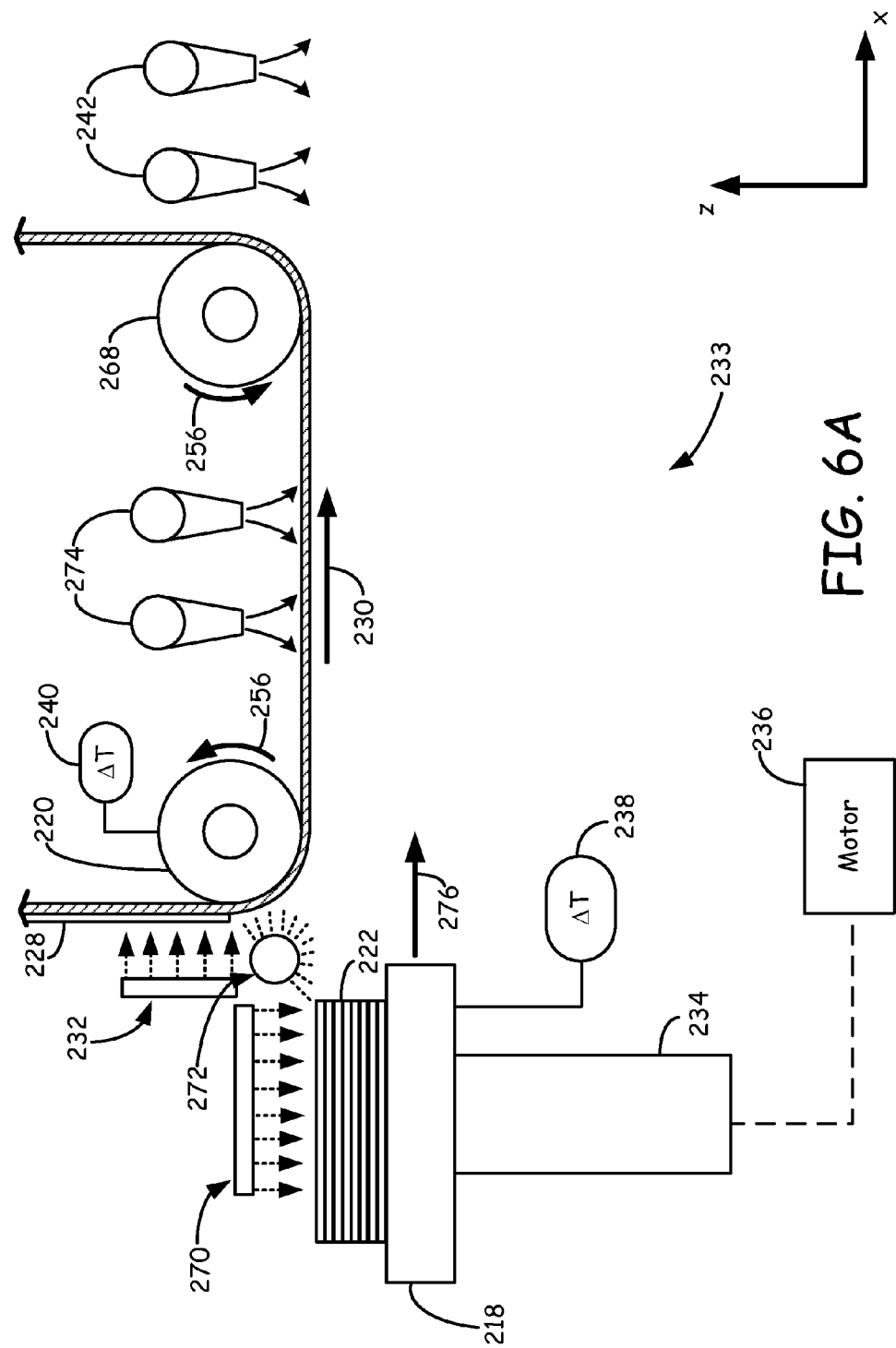

However, as shown in FIG. 6A, layer transfusion assembly 233 includes fusion roller 220 and release roller 268 in lieu of a single nip roller 120, where fusion roller 220 and release roller 268 are each configured to rotate around an axis with the movement of belt 214. The use of separate rollers (i.e., fusion roller 220 and release roller 268) separates the functions of each roller, allowing them to be optimized for their particular purposes. For example, fusion roller 220 may be heated to the fusion temperature of the thermoplastic-based powder, and release roller 268 may be maintained at a substantially lower temperature to assist in delaminating the transfused layers 228 from belt 214.

As further shown, system 210 also includes heaters 270 and 272 and air jets 274. The separation of fusion roller 220 and release roller 268 creates separate transfusion and release steps, and allows a transfixing step to be performed therebetween via cooling by air jets 274. By postponing the release step, fusion roller 220 may be heated to the fusion temperature best suited for the transfusion step, rather than a compromise temperature that facilitates both transfusion and release. This increases the interlayer adhesion between the transfused layers 228.

Prior to printing 3D part 222, build platform 218 and fusion roller 220 may be heated to their desired temperatures. For example, build platform 218 may be heated to the average part temperature and fusion roller 220 may be heated to the fusion temperature of the thermoplastic-based powder. During the printing operation, belt 214 carries a developed layer 228 past heater 232, which heats the developed layer 228 and the associated region of belt 214 to at least the fusion temperature of the thermoplastic-based powder.

Additionally, platen gantry 234 moves build platform 218 along the x-axis in the direction of arrow 276 below, along, or through heater 270. Heater 270 may function in the same manner as heaters 32 and 232, and heats the top surface of 3D part 222 to an elevated temperature, such as at the fusion temperature of the layer material.

As shown in FIG. 6B, the continued rotation of belt 214 and the movement of build platform 218 align the heated layer 228 with the heated top surface of 3D part 222 with proper registration along the x-axis. Furthermore, the heated layer 228 and the heated top surface of 3D part 222 each pass heater 272, which may be configured to heat and/or maintain both the heated layer 228 and the heated top surface of 3D part 222 at the fusion temperature of the layer material. This prevents the heated layer 228 from cooling down prior to reaching fusion roller 220, and brings the temperature of the heated top surface of 3D part 222 to or near the fusion temperature before the next transfusion step is performed. In alternative embodiments, one or more of heaters 232, 270, and 272 may be provided a single heater configured to direct heat in multiple directions (e.g., towards both the layer 228 and the top surface of 3D part 222).

Gantry 234 may continue to move build platform 218 (and 3D part 222) along the x-axis in the direction of arrow 276, at a rate that is synchronized with the rotational rate of belt 214 in the direction of arrow 230 (i.e., the same directions and speed). This causes rear surface 214b of belt 214 to rotate around fusion roller 220 to nip belt 214 and the heated layer 228 against the top surface of 3D part 222. This engages build platform 218 and belt 214, and presses the heated layer 228 between the heated top surface of 3D part 222 and belt 214 at the location of fusion roller 220.

Because layer 228 and the heated top layer of 3D part 222 are each heated to the fusion temperature of the layer material, the pressed heated layer 228 transfuses to the heated top surface of 3D part 222 with a high level of interlayer adhesion. By separating fusion roller 220 and release roller 268, with a cooling step therebetween via air jets 274, layer transfusion assembly 233 allows the layers to be heated to an optimal transfusion interface temperature, and to be cooled to a temperature that fixes the layers before release. For example, the transfusion interface temperature for transfusing the layers together may be at about the fusion temperature of the layer material (e.g., about 200° C.). This substantially increases the extent to which the polymer molecules of the transfused layers interdiffuse to promote interfacial entanglement, while also maintaining dimensional accuracy of 3D part 222.

Figure 6C:
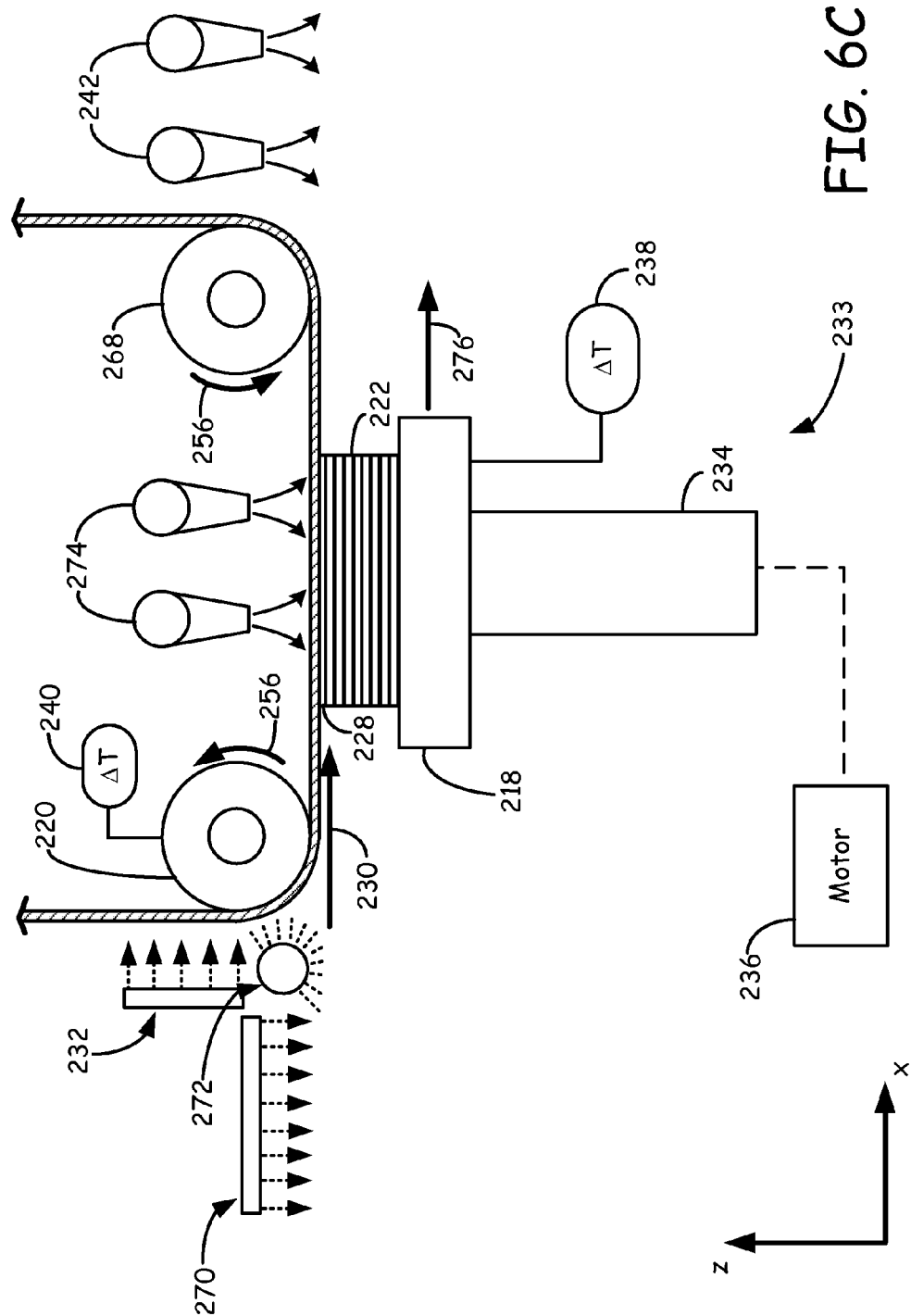

As shown in FIG. 6C, after passing fusion roller 220, and while build platform 218 remains engaged with belt 214, belt 214, build platform 218, and 3D part 222 pass air jets 274. Air jets 274 may function in the same manner as air jets 142 and 242 for cooling belt 214 the side of rear surface 214b. In alternative embodiments, air jets 274 may be a variety of different cooling units, such as refrigeration units, liquid-cooling units, and the like.

As discussed above, if the transfused layer 228 remains too hot, portions of it may remain adhered to front surface 214a of belt 214, rather than cleaning releasing from belt 214. As such, cooling belt 214 with air jets 274 allows the interface between front surface 214a of belt 214 and the transfused layer 228 to cool so that the transfused layer 228 will remain adhered to 3D part 222 and cleanly release from belt 214. This also partially assists in the active cooling of 3D part 222 to maintain 3D part 222 at the average part temperature below its deformation temperature.

Figure 6D:
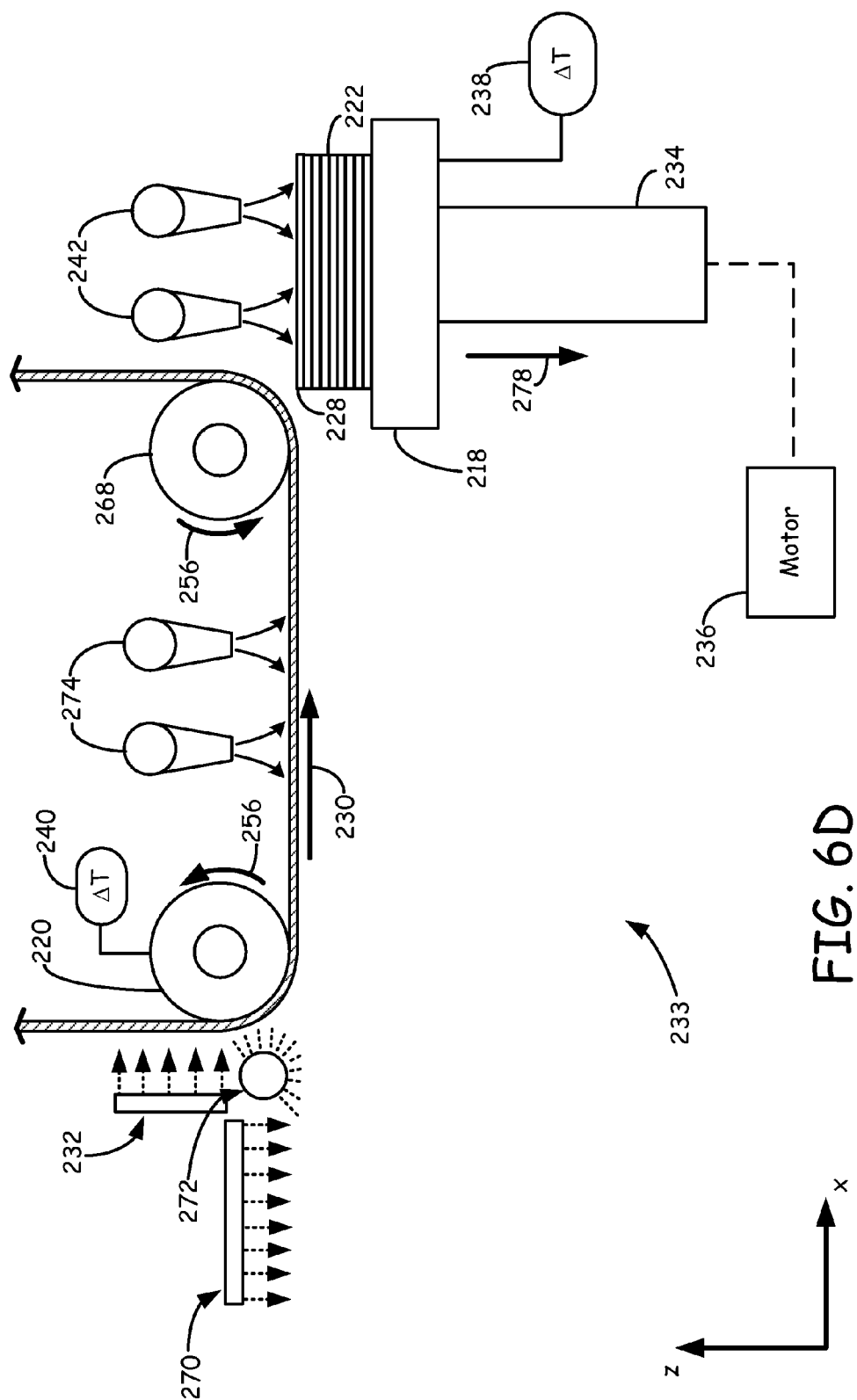

As further shown in FIG. 6D, as the transfused layer 228 passes the nip of release roller 268, belt 214 rotates around release roller 268 to separate and disengage from build platform 218. This assists in releasing the transfused layer 228 from belt 214, in an "assisted delamination" step, allowing the transfused layer 228 to remain adhered to 3D part 222. Additionally, air jets 242 blow cooling air towards the top layers of 3D part 222 as build platform 218 moves along the x-axis past release roller 268. This actively cools the transfused layer 228 down to the average part temperature, as discussed above.

Figure 6E:
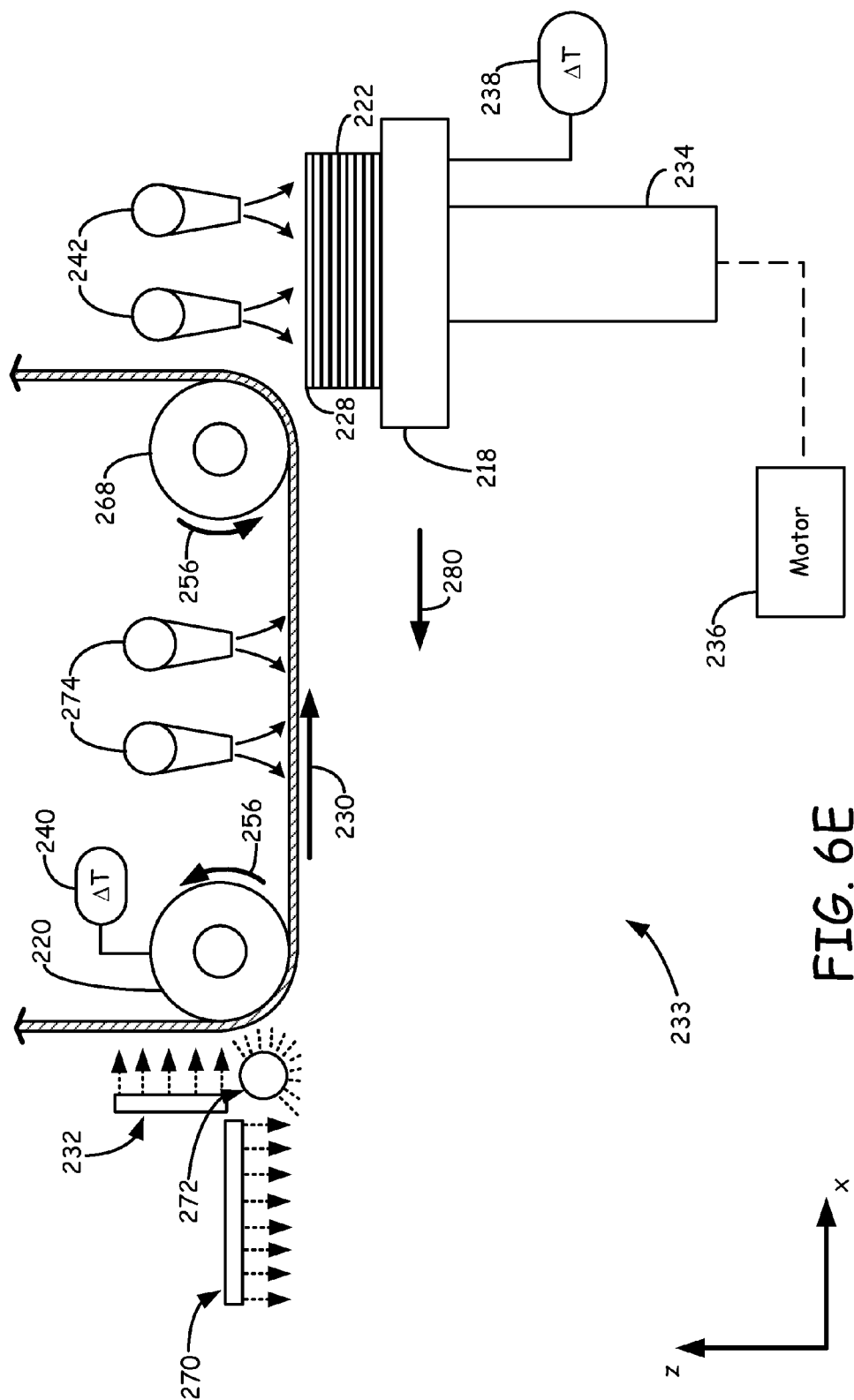

When build platform 218 moves 3D part 222 past release roller 268, gantry 234 may actuate build platform 218 (and 3D part 222) downward, as illustrated by arrow 278. For example, build platform 218 may be incrementally offset downward by a single layer increment. As shown in FIG. 6E, gantry 234 may then move build platform 218 (and 3D part 222) along the x-axis in the direction of arrow 280, back to a starting position along the x-axis.

Figure 6F:
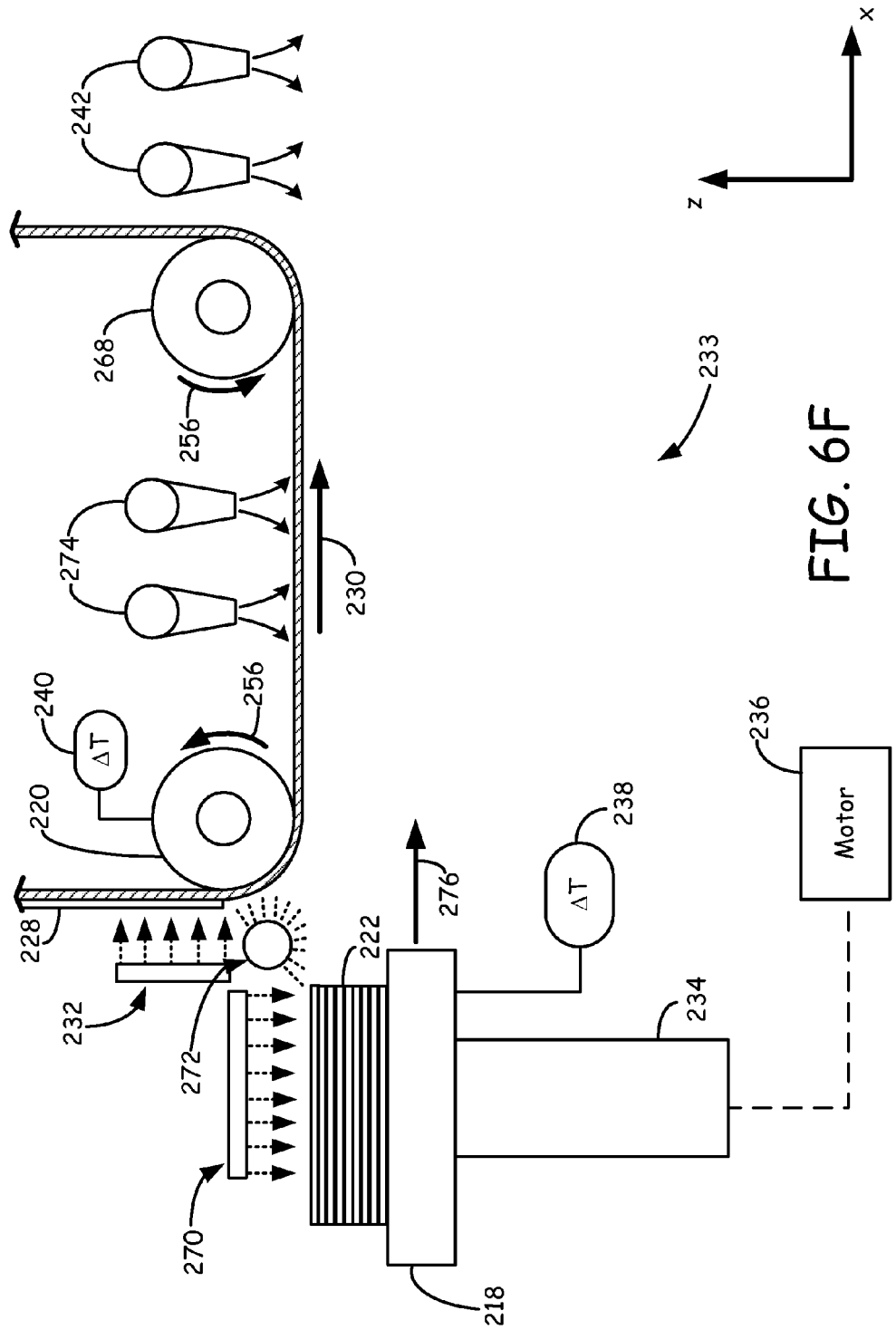

As shown in FIG. 6F, build platform 218 desirably reaches the starting position for proper registration with the next layer 228. The same process may then be repeated for each remaining layer 228 of 3D part 222. Layer transfusion assembly 233 provides the benefits of transfusing the layers together at the fusion temperature to increase interlayer adhesion, while also sufficiently cooling down the interface between front surface 214a of belt 214 and the transfused layers 228 to transfix the layers 228 in place before release from belt 214, and further promotes a clean release by assisting the delamination from belt 214.

In addition, for each printed layer 228, the combination of air jets 242 and 274 (or other cooling units) substantially removes the heat that is added from heating elements 232, 270, 272, and from the heated fusion roller 220, prior to printing the next layer 228. This active cooling substantially removes the heat provided by each layer 228, thereby providing substantially zero heat accumulation after each printed layer 228. As such, 3D part 222 may be substantially maintained at an average part temperature that is below its deformation temperature during the entire printing operation. Further, the top layer surface temperature of the printed 3D part 222 may be brought back up to the fusion temperature after delamination using heater 270 and/or 272 of layer transfusion assembly 233 for optimal transfusion of the next layer 228.

System 10 with layer transfusion assemblies 33, 133, and 233 is suitable for printing 3D parts (and any support structures) from thermoplastic-based powders at high rates and with good part resolutions. In some embodiments, system 10 may print layers of a 3D part at a rate of at least about 40 layers per minutes (e.g., about 50 layers per minute) with accurate registrations, layer thicknesses ranging from about 5 micrometers to about 125 micrometers, and layer dimensions along the y-axis up to at least about 51 centimeters (about 11 inches). For example, system 10 may print a 3D part at a rate of about three inches in height along the vertical z-axis per hour.

The resolutions of the 3D parts may also be varied based on the printing rate. For example, each 3D part may be printed at a "high quality" resolution, in which system 10 operates at a slower rate, but prints with lower layer thicknesses. Alternatively, a 3D part may be printed at a "draft quality" resolution, in which system 10 operates a faster rate, but prints with greater layer thicknesses. Furthermore, a 3D part may be printed in "gray scale", in which a lower density of the part material is developed. Numerous resolutions and speeds therebetween may also be incorporated. In each of these situations, the controller may adjust the applied pressures, temperatures, and/or contact durations during the transfusion steps to account for the different printing rates.

System 10 is illustrated as being configured to print 3D parts (e.g., 3D parts 22, 122, and 222) from a single thermoplastic-based powder. However, the additive manufacturing systems of the present disclosure may also be configured to print 3D parts and/or support structures from multiple part materials and/or support materials derived from thermoplastic-based powders (e.g., multiple compositions and/or colors). Examples of suitable multiple-material systems include those disclosed in U.S. patent application Ser. Nos. 13/242,669 and 13/242,841.

In some embodiments, controller 24 may monitor the applied pressure, the temperature of the layers, and the contact durations during the transfusion steps to maximize or otherwise increase the effectiveness in transferring the layers from the front surface of the transfer belt to the build platform. In an open-loop embodiment, one or more of the applied pressure, temperature, and contact durations may be fixed parameters for a given part material and overall printing rate.

Alternatively, in a closed-loop embodiment, controller 24 may adjust one or more of these parameters in response to the monitored signals using the one or more process control loops. For example, the controller may adjust the pressure applied by press plate 20 or build platforms 118 and 218 in response to changes in the monitored pressure and/or changes in the monitored temperature of the layers. Moreover, controller 24 may adjust the contract durations during the transfusion steps to compensate for changes in the temperatures of layers and/or fluctuations in the monitored applied pressures.

Figure 7:
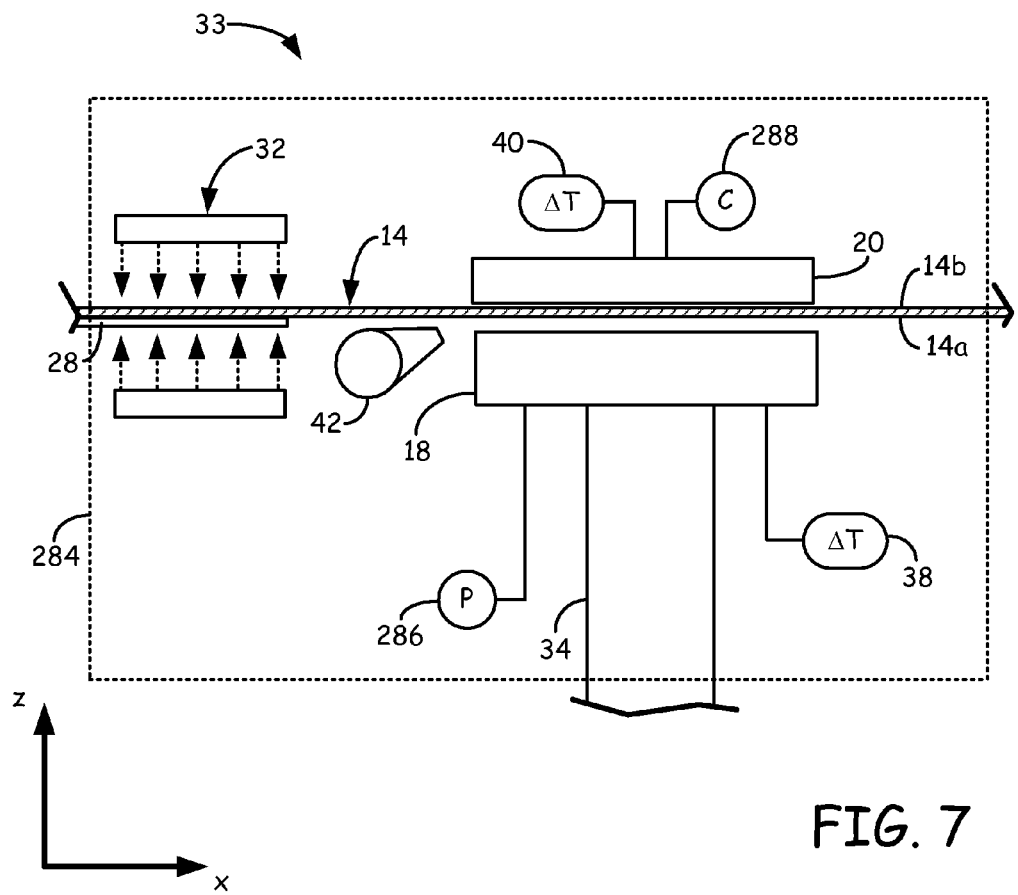
FIG. 7 is an expanded view of another alternative layer transfusion assembly of the electrophotography-based additive manufacturing system, having an enclosable chamber.
Figure 8:
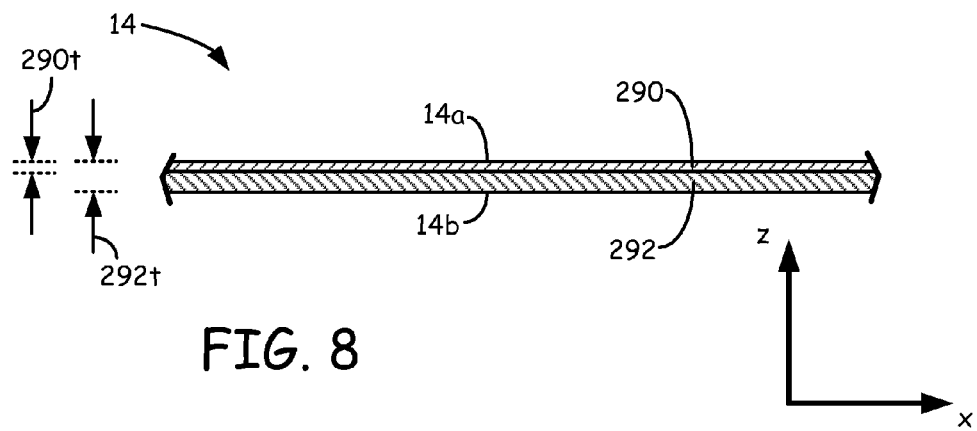
FIG. 8 is a sectional side of a rotatable transfer belt.

As shown in FIG. 7, in some embodiments, system 10 may also include a chamber 284, which can extend around layer transfusion assembly 33, and may define an enclosable environment for printing 3D part 22. While illustrated in use with layer transfusion assembly 33, chamber 284 is equally suitable for use with layer transfusion assemblies 133 and 233. Chamber 284 is a temperature-controllable chamber, which provides greater control over the active cooling step. For example, chamber 284 may be maintained at the average part temperature of 3D part 22.

In these embodiments, chamber 284 may partially enclose z-axis gantry 34 and belt 14, allowing z-axis gantry 34 and belt 14 to extend through the walls of chamber 284. In alternative embodiments, heater 32 may be located outside and upstream of chamber 284. In further alternative embodiments, chamber 284 may be located below press plate 20, allowing build platform 18 to be lowered down into chamber 284. These embodiments further assist in maintaining 3D part 22 at an average part temperature that is below its deformation temperature.

As further shown in FIG. 7, layer transfusion assembly 33, 133, or 233 may also include pressure sensors (e.g., pressure sensor 286) and/or capacitive sensors (e.g., capacitive sensor 288), each of which is configured to communicate with controller 24 over one or more communication lines (not shown). Pressure sensor 286 is one or more sensor assemblies configured to measure the transfusion pressure applied between build platform 18 and press plate 20 (or between build platforms 118/218 and rollers 120/220), allowing controller 24 to monitor the applied transfusion pressure and adjust the height of build platform 18 and/or press plate 20 using one or more process control loops. Examples of suitable sensor assemblies for pressure sensor 286 include one or more strain gauges retained on build platform 18 and/or press plate 20.

Capacitive sensor 288 is one or more capacitive sensor assemblies configured to measure the electrical resistance between build platform 18 and press plate 20 (or between build platforms 118/218 and rollers 120/220). For example, during a transfusion step, capacitive sensor 288 may induce an electrical current from platen 18 to press plate 20 (or vice versa), and measure the intensity of the resulting electrical current through the printed layers 28 of 3D part 22 and belt 14. Since the thickness of belt 14 is constant, the resulting electrical current will reduce as the 3D part 22 grows through the printing of successive layers 28.

Thus, capacitive sensor 288 is suitable for monitoring the height of 3D part 22 and the number of layers 28 transferred to build platform 18. This allows controller 24 to accurately predict the applied pressure during a subsequent pressing step rather than merely relying on the calculated height of a single layer increment. This accurate prediction allows build platform 18 to be quickly raised to an intended height, rather than relying solely on feedback signals from pressure sensor 286.

Build platforms 18, 118, and 218, press plate 20, and rollers 120 and 220 may each also include one or more temperature sensors (not shown) configured to respectively measure the temperatures of the build platforms and press plate/rollers, allowing controller 24 to hold them at the above-discussed temperatures. In a further alternative embodiment, system 10 may include temperature sensors (not shown) configured to measure the temperatures of the 3D part layers. For example, system 10 may include an ultrasonic transducer for measuring the temperature of the layer 28 retained by belt 14 and/or the temperatures of the previously transfused layers 28 of 3D part 22 using acoustic thermometry.

In some embodiments, controller 24 and/or host computer 26 may receive operational mode selections for operating system 10 in different modes. For example, a user may select operational modes such as high quality printing, draft quality printing, and gray scale, as discussed above. Alternatively, system 10 may receive the operational mode selections as default or system generated modes (e.g., a default of a high quality printing). These received operational mode selections may alternatively (or additionally) be set based on the geometry of the 3D part, such as if the 3D part has a small cross-sectional area and/or fine-feature details, as discussed above.

Upon receipt of these operational mode selections, controller 24 and/or host computer 26 may set transfusion parameters for performing the transfusion steps, based on the received operational mode selections. For example, the transfusion pressure, temperature(s), and or duration for each transfusion step may be set or adjusted based on the received operational mode select. This provides greater control over the transfusion steps when operating system 10 to improve printing accuracies and/or printing rates.

System 10 may then image a layer of the 3D part from a thermoplastic-based powder (e.g., develop a layer with EP engine 12), transfer the imaged layer to a transfer medium, heat the imaged layer while the imaged layer is retained on the transfer medium, and transfuse the heated layer to a surface of the three-dimensional part based on the set transfusion parameters.

In some embodiments, the set transfusion parameters allow the transfusion pressure, temperature(s), and or duration for each transfusion steps to vary between different transfusion steps. For example, if a first portion of a 3D part contains a simple block geometry and a second portion of the 3D part contains a fine-feature geometry, controller 24 and/or host computer 26 may set the transfusion parameters such that the layers used to form the simple block geometry are transfused differently (e.g., higher transfusion pressure) from those used to form the fine-feature geometry (e.g., lower transfusion pressure).

FIGS. 8 and 9A-9C illustrate a suitable embodiment for belt 14 (shown in FIGS. 1, 2, and 4A-4D), and is equally suitable for belt 114 (shown in FIGS. 5A-5E) and belt 214 (shown in FIGS. 6A-6F). In the embodiment shown in FIG. 8, belt 14 is a multiple-layer belt that includes layer or film 290 (defining front surface 14*a*) and base portion 292 (defining rear surface 14*b*).

Film 290 and base portion 292 are desirably derived from materials that are suitable for transferring the layers 28 of part (or support) materials from EP engine 12 to build platform 18, that are thermally stable at the fusion temperatures of the part and support materials, and that are robust for continued operation at high rotational speeds while being repeatedly heated and cooled during the heating and active cooling steps.

Film 290 is derived from one or more low-surface energy materials, thereby allowing the received layers 28 to effectively release from front surface 14*a* to build platform 18. Examples of suitable materials for film 290 include one or more fluorinated polymers, such as polytetrafluoroethylenes (PTFE), fluorinated ethylene propylenes, and perfluoroalkoxy polymers. Examples of suitable commercially available fluorinated polymers include PTFE available under the trade designation "TEFLON" from E.I. du Pont de Nemours and Company, Wilmington, Del.

Base portion 292 is derived from one or more materials that promote good electrostatic attraction for the thermoplastic-based powders to front surface 14*a* via triboelectric charges. Examples of suitable materials for base portion 292 include one or more polyimide materials, such as those commercially available under the trade designation "KAPTON" from E.I. du Pont de Nemours and Company, Wilmington, Del., which may be doped with one or more conductive materials to promote the triboelectric charges. In some embodiments, belt 14 may also include one or more additional layers between film 290 and base portion 292, such as one or more tie layers.

Figure 9A:
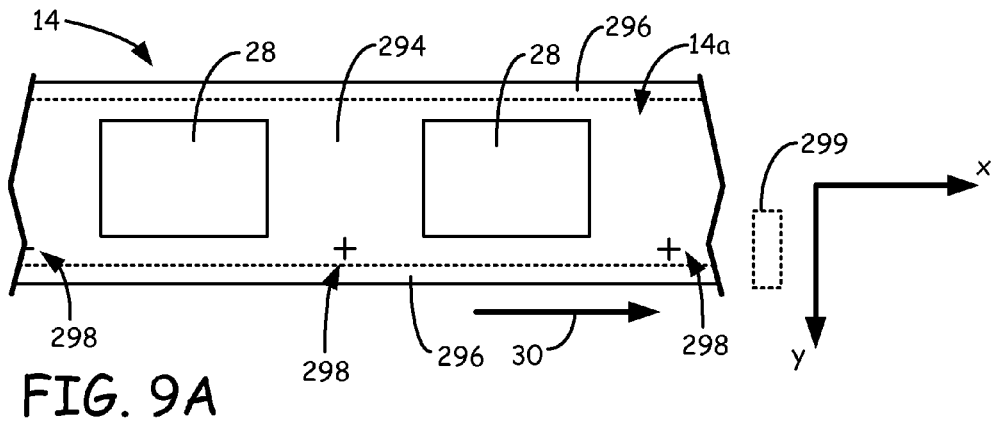
FIG. 9A is a top view of a first embodiment of the rotatable transfer belt, having receiving regions and encoder markings.
Figure 9B:
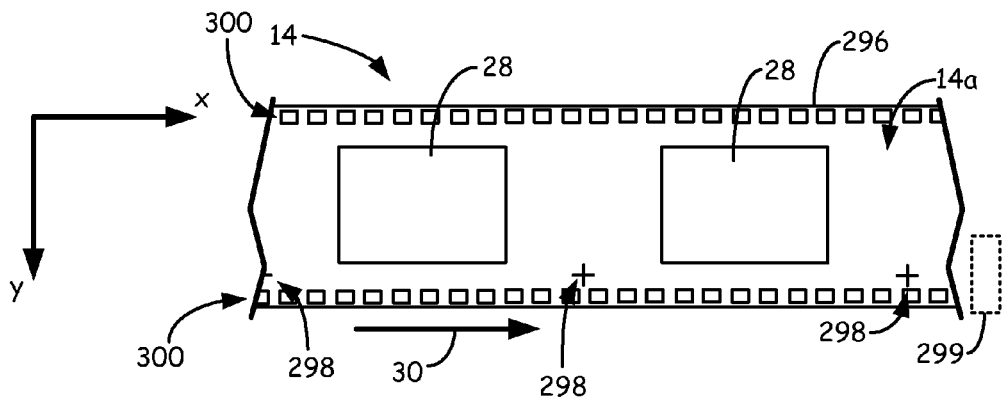
FIG. 9B is a top view of a second embodiment of the rotatable transfer belt, having holes for engagement in a tractor-feed manner.
Figure 9C:
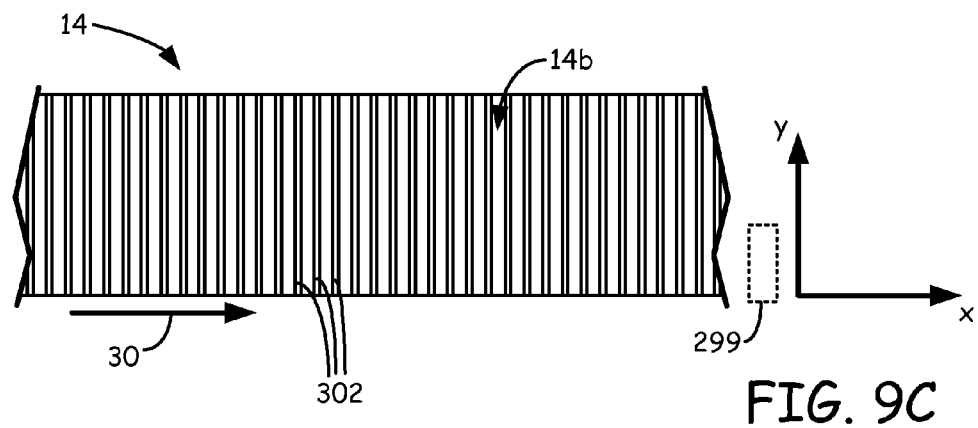
FIG. 9C is a bottom view of a third embodiment of the rotatable transfer belt, having rear ribs for engagement in a timing-belt manner.

FIGS. 9A-9C illustrate alternative embodiments for belt 14 for engaging with various drive rollers of system 10. As shown in FIG. 9A, front surface 14*a* of belt 14 may include receiving region 294 and edge regions 296 on opposing lateral sides of receiving region 294. Receiving region 294 is the region of front surface 14*a* on which layers 28 are retained for transfer between EP engine 12 and build platform 18. Edges regions 296 are the regions at which one or more drive mechanisms may engage drive belt 14.

For example, one or more rollers (e.g., rollers 16, nip roller 120, fusion roller 220, release roller 268, and/or any service-loop roller) may engage front surface 14*a* and/or rear surface 14*b* at edge regions 296 to ensure the rollers to not interfere with the developed layers 28. In some embodiments, pairs of opposing rollers (not shown) may simultaneously engage front surface 14*a* and rear surface 14*b* at edge regions 296 to nip and drive belt 14 in the direction of arrow 30.

Registration along the x-axis may be maintained with the use of encoder markings 298. Encoder markings 298 may be pre-marked on front surface 14*a* and/or rear surface 14*b* at preset increments along the x-axis, or may be printed with the developed layers 28 to identify relative locations of the developed layers 28 along the x-axis. System 10 may also include one or more optical readers (e.g., optical reader 299) to locate encoder markings 298 as belt 14 rotates in the direction of arrow 30.

Alternatively, as shown in FIG. 9B, belt 14 may include an array of holes 300 or other openings that extend through film 290 and base portion 292 adjacent to the lateral edges of belt 14. Holes 300 are configured to engage with reciprocating gear teeth (not shown) of one or more rollers (e.g., rollers 16, nip roller 120, fusion roller 220, release roller 268, and/or any service-loop roller) to drive belt 14 in a tractor-feed manner. In this embodiment, registration along the x-axis may also be maintained with the use of encoder markings 298, if desired. Alternatively, holes 300 may themselves function as encoder markings in the same manner. System 10 may also include one or more optical readers (e.g., optical reader 299) to locate encoder markings 298 and/or holes 300 as belt 14 rotates in the direction of arrow 30.

FIG. 9C shows yet another alternative embodiment in which belt 14 includes rear ribs 302 that extend laterally along rear surface 14*b*. Ribs 302 are configured to engage with reciprocating gear teeth (not shown) of one or more rollers (e.g., rollers 16, nip roller 120, fusion roller 220, release roller 268, and/or any service-loop roller) to drive belt 14 in a timing-belt manner. In this embodiment, registration along the x-axis may also be maintained with the use of encoder markings corresponding to encoder markings 298, if desired. Alternatively, ribs 300 may themselves function as encoder markings in the same manner. System 10 may also include one or more optical readers (e.g., optical reader 299) to locate the encoder markings and/or holes ribs as belt 14 rotates in the direction of arrow 30.

FIGS. 9A-9C illustrate example engagement mechanisms for belt 14, allowing belt 14 to engage with one or more drive mechanisms of system 10. However, belt 14 may alternatively include different engagement mechanisms as particular designs may require.

Figure 10:
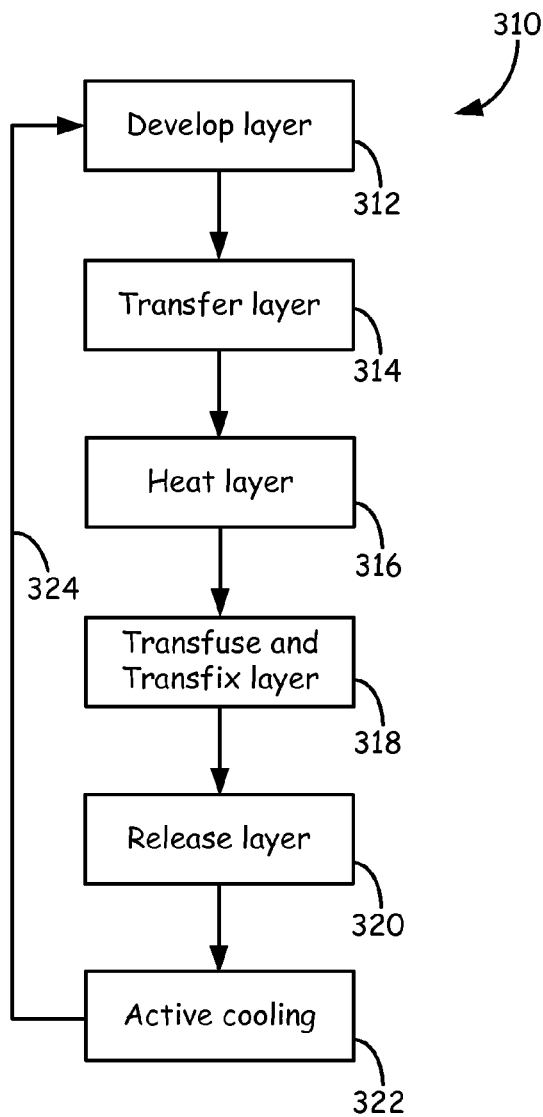
FIG. 10 is a flow diagram of a first embodied method for the layer transfer technique of the present disclosure, having a combined transfusion and transfixing step, and an active cooling step.
Figure 11:
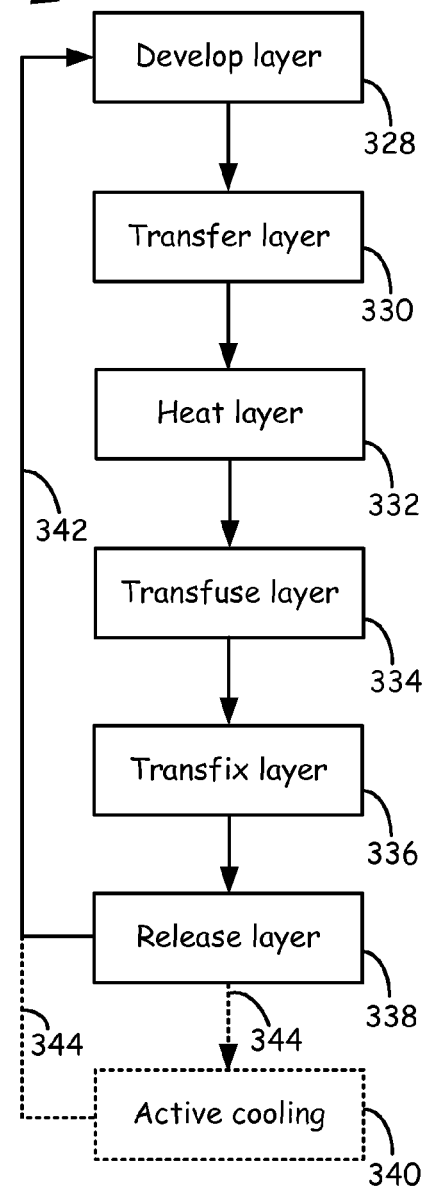
FIG. 11 is a flow diagram of a second embodied method for the layer transfer technique, having separate transfusion and transfixing steps, and an optional active cooling step.
Figure 12:
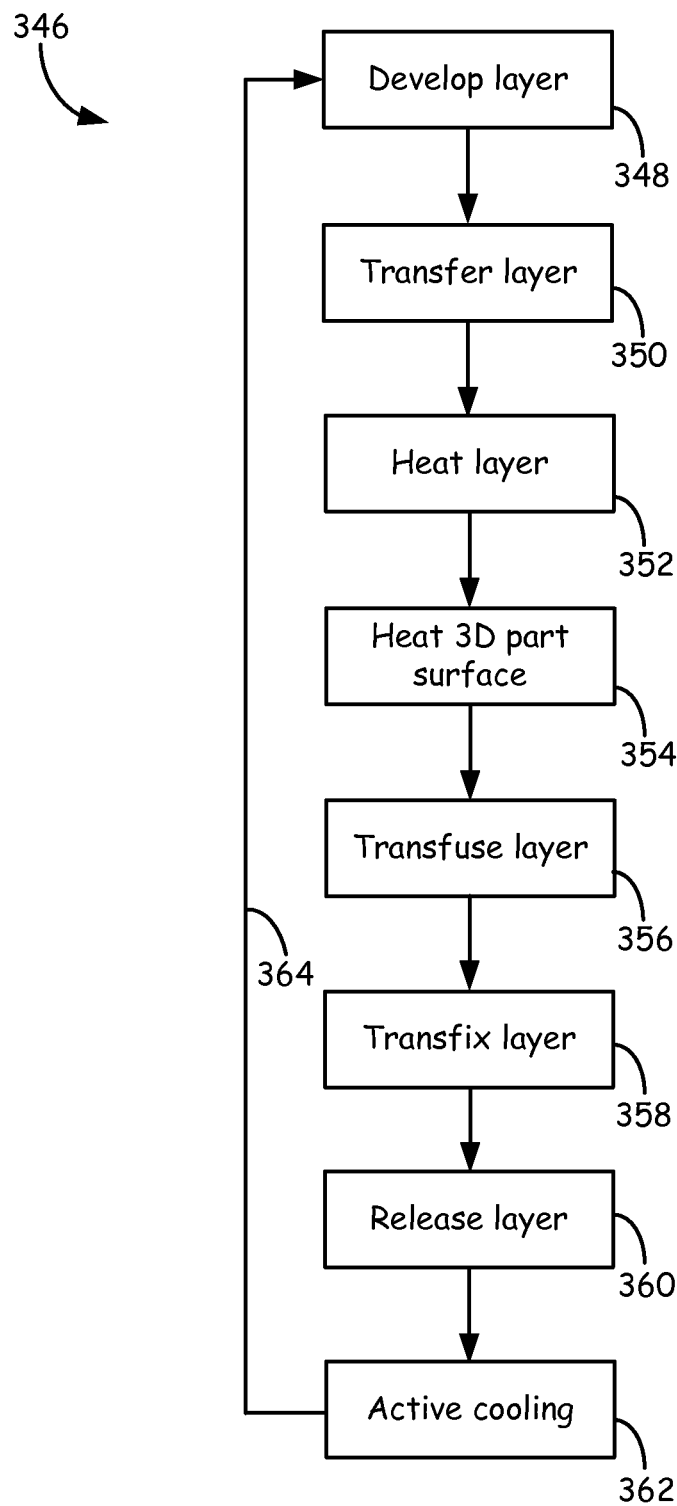
FIG. 12 is a flow diagram of a third embodied method for the layer transfer technique, having a part surface heating step, separate transfusion and transfixing steps, and an active cooling step.

FIGS. 10-12 are flow diagrams of embodied methods for the layer transfer technique of the present disclosure, which may be performed with system 10. FIG. 10 illustrates method 310, which may be performed with system 10 having layer transfusion assembly 33 (shown in FIGS. 1, 2, and 4A-4D) and/or layer transfusion assembly 133 (shown in FIGS. 5A-5E). As shown, method 310 includes step 312-324, and initially involves developing or otherwise imaging a layer (step 312), such as with EP engine 12. The imaged layer may then be transferred on a transfer medium (e.g., belts 14 and 114) from a first location at EP engine 12 to a second location at the layer transfusion assembly (e.g., layer transfusion assemblies 33 and 133) (step 314).

Prior to reaching the second location at the layer transfusion assembly, the layer is heated to at least a fusion temperature of the thermoplastic-based powder (e.g., at heaters 32 and 132) (step 316). Upon reaching the layer transfusion assembly, the heated layer is then transfused and transfixed in a combined step (step 318).

For example, for layer transfusion assembly 33, press plate 20 may engage build platform 18 to transfuse the heated layer 28 to the top surface of 3D part 22. Because press plate 20 may be heated to a temperature that is lower than the fusion temperature, the contact between press plate 20 and rear surface 14b of belt 14 cools down the interface between belt 14 and the transfused layer 28, increasing the adhesive force of the interdiffused polymers in the transfused layer 28 and 3D part 22 relative to the adhesive force of the transfused layer 28 to surface 14a of belt 14, thereby maintaining the transfused layer adhered to the 3D part in a fixed spatial position.

The transfused and transfixed layer may then be released from the transfer medium (step 320), such as by retracting press plate 20 and/or build platform 18, or by the separation of belt 114 from build platform 118 by belt 114 winding around nip roller 120. The transfixing step discussed above allows the transfused layer to cleanly release from the transfer medium and remain adhered to the 3D part.

The 3D part may then be actively cooled (e.g., with air knives 42 and air jets 142) (step 322). As discussed above, because the imaging system (e.g., system 10) is capable of printing the layers at speeds that are much faster than the rate at which heat diffuses through the variable thermal resistance of the 3D parts, heat can accumulate in the 3D parts, which, if not accounted for, can exceed a deformation temperature of the 3D part, causing the bulk of the 3D part to soften enough reduces its structural integrity. Such a soft part may deform under a subsequently-applied transfusion pressure during a subsequent transfusion step.

To overcome this issue while maintaining fast printing rates, the 3D part may be actively cooled between each transfusion step 318 to maintain the 3D part at an average part temperature that is lower than the deformation temperature of the 3D part. Steps 312-324 may then be repeated for each layer of the 3D part until the printing operation is completed (as indicated by arrow 324). By heating each layer to at least the fusion temperature of the thermoplastic-based powder, followed by transfusing/transfixing, and active cooling allows system 10 to print 3D parts with good part quality and strengths (e.g., z-strengths).

FIG. 11 illustrates method 326, which is similar to method 310 (shown in FIG. 10), and may be performed with system 10 having layer transfusion assembly 233 (shown in FIGS. 6A-6F) (and with layer transfusion assembly 33 in the embodiment in which belt 14 remains in contact with the transfused layer 28 after press plate 20 retracts). Method 326 includes steps 328-342, where steps 328, 330, 332, 338, 340, and 342 may be performed in the same manner as the respective steps of method 310.

However, instead of a combined transfusion and transfixing step 318 of method 310, method 326 includes a transfusion step 334 and transfixing step 335, which are separate. for example, layer transfusion assembly 233 includes a heated fusion roller 220 (for transfusion step 334) and release roller 268 (for release step 338), which are separated by air jets 274 (for a cooling or transfixing step 336). This allows the layers to be heated to an optimal transfusion interface temperature at the heating step 332, and during the transfusion step 334, and then to be cooled to a temperature that fixes the layers (at transfixing step 336) before release at release step 338. This substantially increases the extent to which the polymer molecules of the transfused layers interdiffuse to promote interfacial entanglement, while also maintaining dimensional accuracy of the 3D part.

Moreover, the release of the transfused layer from the transfer medium may be assisted during the release step 338. For example, release roller 268 may assist in releasing transfused layer 228 from belt 214 by increasing the angle of separation between belt 214 and build platform 218, which increases the ease at which transfused layer 228 delaminates from belt 214.

As further shown in FIG. 11, the active cooling step 340 may be an optional step of method 326 (as illustrated with the broken lines 344). For example, system 10 may instead operated at a lower printing speed to allow heat to diffuse from the 3D part. However, as discussed above, the active cooling step 340 is desirable for maintaining the structural integrity of the 3D part while printing at high speeds.

FIG. 12 illustrates method 346, which is similar to method 310 (shown in FIG. 10) and method 326 (shown in FIG. 11), and may be performed with system 10 having layer transfusion assembly 233 (shown in FIGS. 6A-6F). Method 346 may also be performed with layer transfusion assembly 33 in the embodiment that includes one or more heaters corresponding to heaters 270 and 272. Method 346 includes steps 348-364, where steps 348, 350, 352, 356, 358, 360, 362, and 364 may be performed in the same manner as the respective steps of method 326.

However, method 346 also includes step 354, in which the top surface or layer(s) of the 3D part is also pre-heated prior to the transfusion step 356. For example, with layer transfusion assembly 233, heaters 270 and 272 may heat the top surface or layer(s) of 3D part 222 to at least the fusion temperature of the thermoplastic-based powder. Because layer 228 and the heated top surface/layer of 3D part 222 are each heated to the fusion temperature of the layer material, the pressed heated layer 228 transfuses to the heated top surface/layer of 3D part 222 with a high level of interlayer adhesion (during transfusion step 358).

Furthermore, by separating fusion roller 220 and release roller 268, with a cooling or transfixing step 358 therebetween via air jets 274, layer transfusion assembly 233 allows the layers to be heated to an optimal transfusion interface temperature, and to be cooled to a temperature that fixes the layers before release. This substantially increases the extent to which the polymer molecules of the transfused layers interdiffuse to promote interfacial entanglement, while also maintaining dimensional accuracy of the 3D part.

EXAMPLES

The present disclosure is more particularly described in the following examples that are intended as illustrations only, since numerous modifications and variations within the scope of the present disclosure will be apparent to those skilled in the art.

Example 1

For the printing operations of Example 1, 3D parts were printed with an additive manufacturing system corresponding to the system shown in FIGS. 1, 2, and 4A-4D, having a moveable press plate and a vertically-actuatable build platform, each of which were heated. The 3D parts were printed from an ABS part material, where each layer was developed with an electrophotography engine and transferred to a rotatable transfer belt looped around a service loop design. The developed layer was carried by the transfer belt to an infrared heater to heat the layer to a fusion temperature of ABS part material.

The heated layer was then transferred to and aligned over the build platform. The press plate was actuated downward to transfuse the heated layer against a previously-transfused layer of the 3D part (or to the build platform for the initial layer). The press plate was then retracted, which cleanly delaminated the layer from the transfer belt, allowing the layer to remain transfused to the 3D part.

Cooling air from an air knife was also directed to the top layers of the 3D part. This removed the additional heat from the transfused layer to provide an average part temperature of that maintained the structural integrity of the 3D part, where the 3D part did not slump or melt due to heat accumulation. This process was repeated for each layer of the 3D part. The air knife and the press plate successfully maintained the average part temperature below the deformation temperature of the 3D part during the entire printing operation. The resulting 3D parts exhibited good part resolution, dense fill, and good dimensional integrity.

Example 2

For the printing operations of Example 2, 3D parts were printed with an additive manufacturing system corresponding to the system shown in FIGS. 5A-5E, having a nip roller and a moveable build platform, each of which were heated. The 3D parts were printed from an ABS part material, where each layer was developed with an electrophotography engine and transferred to a rotatable transfer belt looped around a service loop design. In these Examples, the service loop was used to protect the transfer belt against tension stress. The developed layer was carried by the transfer belt to an infrared heater to heat the layer to a fusion temperature of the ABS part material.

The heated layer was then transferred to and aligned over the build platform. The build platform was actuated upward to transfused the heated layer against a previously-transfused layer of the 3D part (or to the build platform for the initial layer). In particular, actuating the build platform upward pressed the heated layer and transfer belt between the build platform (or against a previously-transfused layer of the 3D part) and the nip roller. The build platform was then moved at a synchronized rate with the transfer belt, and then released at a downstream location. This cleanly delaminated the layer from the transfer belt, allowing the layer to remain transfused to the 3D part.

Cooling air from air lets was also directed to the top layers of the 3D part. This removed the additional heat from the transfused layer to provide an average part temperature of that maintained the structural integrity of the 3D part, where the 3D part did not slump or melt due to heat accumulation. The build platform was then moved back to its starting position, and the process was repeated for each layer of the 3D part. In these Examples, the air jets also successfully maintained the average part temperature below the deformation temperature of the 3D part during the entire printing operation. The resulting 3D parts also exhibited good part resolution, dense fill, and good dimensional integrity.

Comparative Examples A and B

For the printing operations of Comparative Examples A and B, 3D parts were printed with the same additive manufacturing systems respectively used for Examples 1 and 2. However, for Comparative Examples A and B, the air knife or jet cooling was omitted. Otherwise, the processes were performed in the same manner as discussed above for Examples 1 and 2.

For the printing operations of Comparative Examples A and B, prior to the completion of each printed 3D part, the printed layers began to compress and flatten. As discussed above, this is believed to be due to heat accumulating in the printed layers, which was unable to diffuse sufficiently between each printed layer. The accumulated heat softened the bulk of the 3D part, causing it to compress during subsequent transfusion steps. This resulted in deformed 3D parts.

As such, the layer transfer technique of the present disclosure including the active cooling is beneficial for printing 3D parts at high rates using electrophotography. The active cooling was successfully implemented to remove the added heat from each fused layer prior to the transfusion of the next layer. This allowed the 3D parts printed with the systems in Examples 1 and 2 to be maintained at average part temperatures below their deformation temperatures, but high enough to promote good interlayer adhesion and reduced curl.

Although the present disclosure has been described with reference to preferred embodiments, workers skilled in the art will recognize that changes may be made in form and detail without departing from the spirit and scope of the disclosure.

The invention claimed is:

1. An additive manufacturing system for printing a three-dimensional part, the additive manufacturing system comprising:
an imaging engine configured to develop imaged layers of a thermoplastic-based powder;
at least three rollers, wherein each roller is positioned in a fixed position and rotatable about an axis of rotation, wherein at least a first roller comprises a nip roller and the second roller comprises a release roller wherein the fixed positions of the nip roller and the release roller are proximate a build plane and wherein the fixed position of a third roller of the at least three rollers is located a distance from the build plane;
a rotatable belt having a first surface and a second surface, the rotatable belt configured to receive imaged layers of a thermoplastic-based powder on the first surface, each imaged layer having a length from a leading edge to a trailing edge and a width from a first side to a second side, wherein the second surface of the belt is configured to engage the at least three rollers and wherein the at least three rollers define a path of travel of the belt wherein the travel path of the belt proximate the build plane follows a first distance between a transfer engaging location at the nip roller and a transfer disengaging location at the release roller, and the travel path descends in a rotational direction toward the nip roller and ascends in a rotational direction away from the build plane proximate the transfer disengaging location;
a first heater configured to heat the imaged layers on the belt;

a build platform configured to move and receive the imaged layers from the belt in a layer-by-layer manner to print the three-dimensional part on the build platform; and a gantry configured to move the build platform in a reciprocating pattern such that a top surface of the part being formed on the build platform travels within the build plane and out of the build plane, the movement being synchronized with the rotational rate of the belt wherein the gantry is configured to move the top surface of the part being formed in the build plane a second distance from a first build plane location to a second build plane location wherein the second distance is longer than the first distance, wherein the first build plane location is located a third distance in an upstream direction of the transfer engaging location such that the part being formed on the build platform is not in contact with the imaged layer or the belt at the first build plane location, and the leading edge of the imaged layer is configured to register with a front location of the build platform at the nip roller as the top surface of the part being formed moves in the build plane such that the imaged layer is transferred to the previously printed layer in a line by line manner across the width of the imaged layer utilizing pressure and heat as the nip roller rotates and the build platform is moved from the first build plane location to the second build plane location, and wherein the second build plane location is located a distance from the transfer disengaging location such that the trailing edge is configured to disengage the belt as the top surface of the part being formed moves in the build plane.

2. The additive manufacturing system of claim 1, wherein the imaging engine comprises an electrophotography engine which is configured to develop the imaged layers from the thermoplastic-based powder.

3. The additive manufacturing system of claim 1, wherein the belt comprises a multiple-layer belt.

4. The additive manufacturing system of claim 1, wherein the gantry is configured to move the build platform in a reciprocating rectangular pattern.

5. The additive manufacturing system of claim 1, and further comprising a second heater spaced apart from the fixed location of the nip roller and configured to heat a surface of the three-dimensional part prior to engaging the nip roller.

6. The additive manufacturing system of claim 1, wherein the nip roller comprises a heatable roller.

7. The additive manufacturing system of claim 1, further comprising:
a first cooling unit configured to cool the transfer medium between the nip roller and the release roller.

8. The additive manufacturing system of claim 7, wherein the nip roller is configured to be heated to at least the fusion temperature of the thermoplastic-based powder.

9. The additive manufacturing system of claim 1, and further comprising a cooling unit located downstream of the release roller, the second cooling unit configured to hold the part at about a creep relaxation temperature of the thermoplastic-based powder.

10. The additive manufacturing system of claim 9, wherein the cooling unit is further configured to hold the part within about 10° C. degrees Celsius of a creep relaxation of the thermoplastic-based powder.

11. The additive manufacturing system of claim 1, and further comprising a second heater configured to heat the movable build platform to assist in maintaining the average part temperature.

12. The additive manufacturing system of claim 1, and further comprising a cooling unit located downstream from the transfer disengaging location, the cooling unit configured to actively cool the transfused layers to hold the printed three-dimensional part at about an average part temperature that is below a deformation temperature of the three-dimensional part.

13. An additive manufacturing system for printing a three-dimensional part, the additive manufacturing system comprising:

at least two rollers, wherein each roller is positioned in a fixed position and rotatable about an axis of rotation, wherein at least a first roller comprises a nip roller and a second roller comprises a release roller spaced a first distance from the nip roller, wherein the fixed positions of the nip roller and the release roller are proximate a build plane wherein the nip roller and the release roller define a path of travel of a belt proximate the build plane and wherein the travel path descends in a rotational direction toward the build plane proximate the nip roller and ascends in a rotational direction away from the build plane proximate the release roller;

the rotatable belt having a front side and a back side, the front side configured to receive a developed layer of a thermoplastic-based powder from an electrophotography engine and the back side configured to engage the at least two rollers wherein the developed layer has a leading edge and a trailing edge and a width defined by first and second side surfaces;

a build platform configured to move and receive the imaged layers from the belt in a layer-by-layer manner to print the three-dimensional part on the build platform;

a gantry configured to move the build platform in a reciprocating pattern such that a top surface of the part being formed on the build platform travels within the build plane and out of the build plane, the movement being synchronized with the rotational rate of the belt wherein the gantry is configured to move the top surface of the part being formed in the build plane a second distance from a first build plane location to a second build plane location wherein the second distance is longer than the first distance, wherein the first build plane location is located a third distance in an upstream direction of the nip roller such that the part being formed on the build platform is not in contact with the imaged layer or the belt at the first build plane location, and the leading edge of the imaged layer is configured to register with a front location of the build platform at the nip roller as the top surface of the part being formed moves in the build plane such that the imaged layer is transferred to the previously printed layer in a line by line manner across the width of the imaged layer utilizing pressure and heat as the nip roller rotates and the build platform is moved from the first build location to the second build location, and wherein the second build plane location is located a distance from the release roller such that the trailing edge is configured to disengage the belt as the top surface of the part being formed moves in the build plane.

14. The additive manufacturing system of claim 13, wherein the rotatable belt comprises a multiple-layer belt.

15. The additive manufacturing system of claim 13, wherein the gantry is configured to move the build platform in a reciprocating rectangular pattern.

16. The additive manufacturing system of claim 13, and further comprising:
- a first cooling unit configured to cool the rotatable belt between the nip roller and the release roller.

17. The additive manufacturing system of claim 13, and further comprising a heater spaced apart from the nip roller and configured to heat a surface of the three-dimensional part prior to each layer transfusion.

18. The additive manufacturing system of claim 13, and further comprising a cooling unit configured to cool the transfer medium between the nip roller and the release roller.

19. The additive manufacturing system of claim 13, and further comprising a cooling unit located downstream from the release roller, the cooling unit configured to actively cool the transfused layers to hold the printed three-dimensional part at about an average part temperature that is below a deformation temperature of the three-dimensional part.

20. The additive manufacturing system of claim 13, and further comprising a first heater configured to heat the developed layer on the belt.

21. The additive manufacturing system of claim 20, and further comprising a second heater configured to heat the upper surface of the part being printed prior to engaging the belt proximate the nip roller.

22. The additive manufacturing system of claim 13, and wherein the nip roller is configured to be heated.

\* \* \* \* \*